US008479168B2

(12) United States Patent
Ike

(10) Patent No.: US 8,479,168 B2
(45) Date of Patent: Jul. 2, 2013

(54) COMPUTER-READABLE RECORDING MEDIUM STORING VERIFICATION SUPPORT PROGRAM, INFORMATION PROCESSOR, AND VERIFICATION SUPPORT METHOD

(75) Inventor: Atsushi Ike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 12/631,441

(22) Filed: Dec. 4, 2009

(65) Prior Publication Data
US 2010/0229158 A1 Sep. 9, 2010

(30) Foreign Application Priority Data

Mar. 6, 2009 (JP) .................................. 2009-54148

(51) Int. Cl.
*G06F 9/44* (2006.01)
(52) U.S. Cl.
USPC ........................................................ 717/128
(58) Field of Classification Search
USPC ........................................................ 717/128
See application file for complete search history.

(56) References Cited

U.S. PATENT DOCUMENTS 7,471,955 B2 * 12/2008 Muramatsu ................ 455/456.6
7,706,369 B2 * 4/2010 Roese et al. .................. 370/389

FOREIGN PATENT DOCUMENTS

JP      8-241327      9/1996

* cited by examiner

*Primary Examiner* — Chun-Kuan Lee
(74) *Attorney, Agent, or Firm* — Staas & Halsey LLP

(57) ABSTRACT

An information processing and method include acquiring a trace group indicating instants of time of execution of processing operations and vestiges of contents of the execution, behavior information indicating behaviors of a processor of the arbitrary system, and state information indicating state transitions of an arbitrary hardware device other than the processor. A behavior trace searching unit searches when an arbitrary behavior is specified from behaviors indicated by the behavior information, a state trace searching unit searches when an arbitrary state transition is specified from the state transition indicated by the state information, an associating unit associates, the traces found by the behavior trace searching unit and the traces found by the state trace searching unit according to an instruction and an outputting unit outputs the traces associated by the associating unit as traces for a simulation of the behaviors.

20 Claims, 21 Drawing Sheets

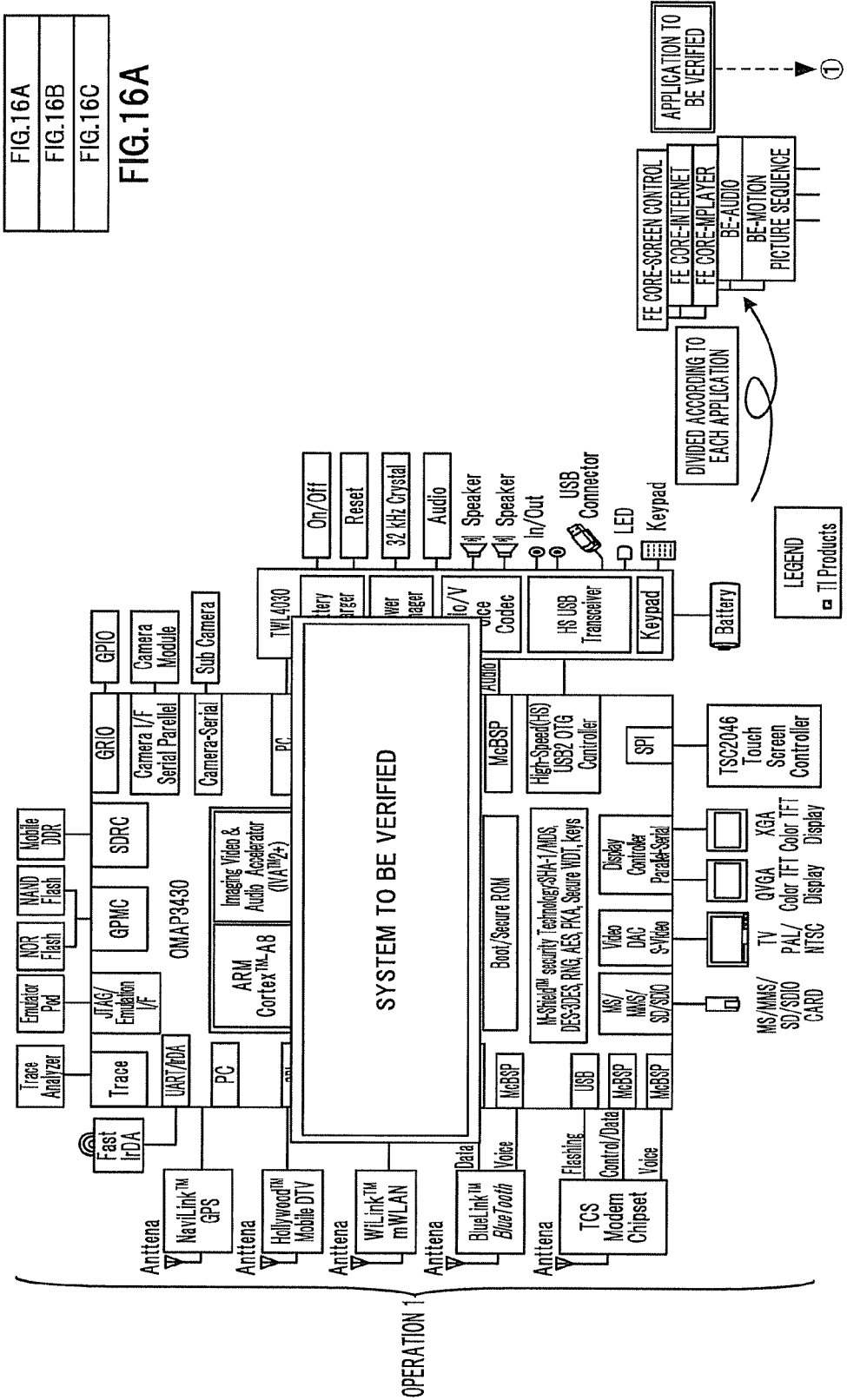

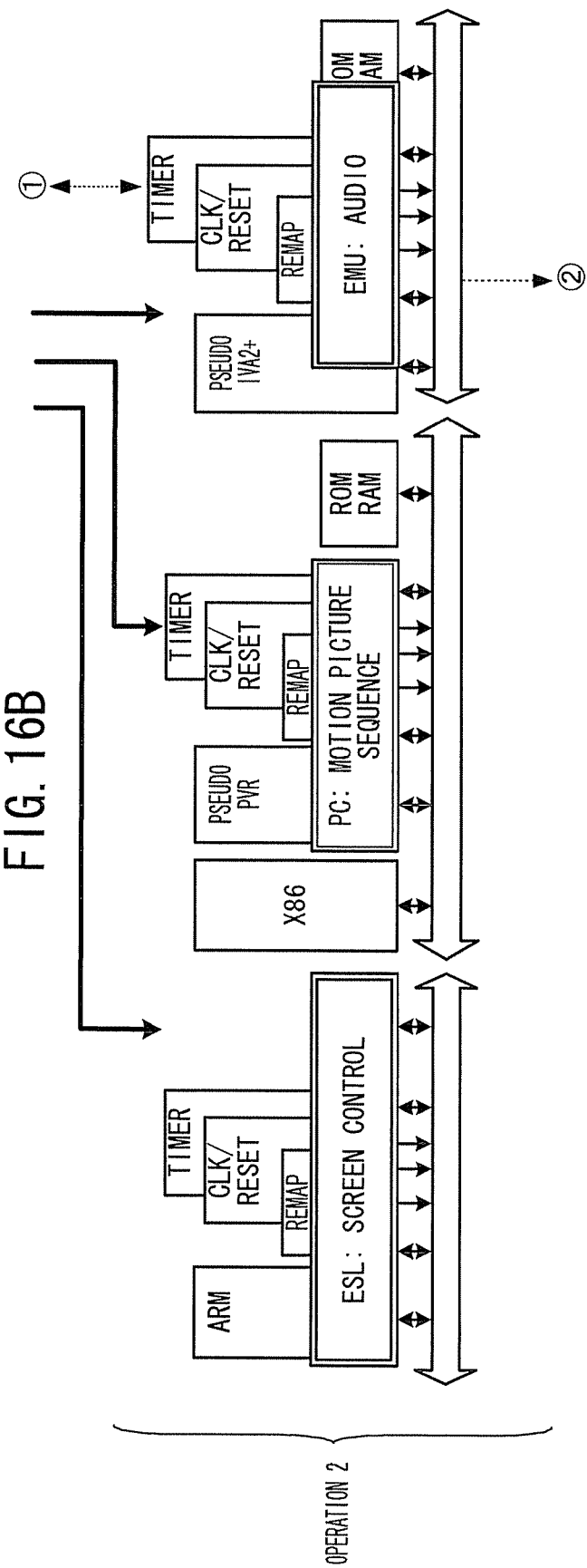

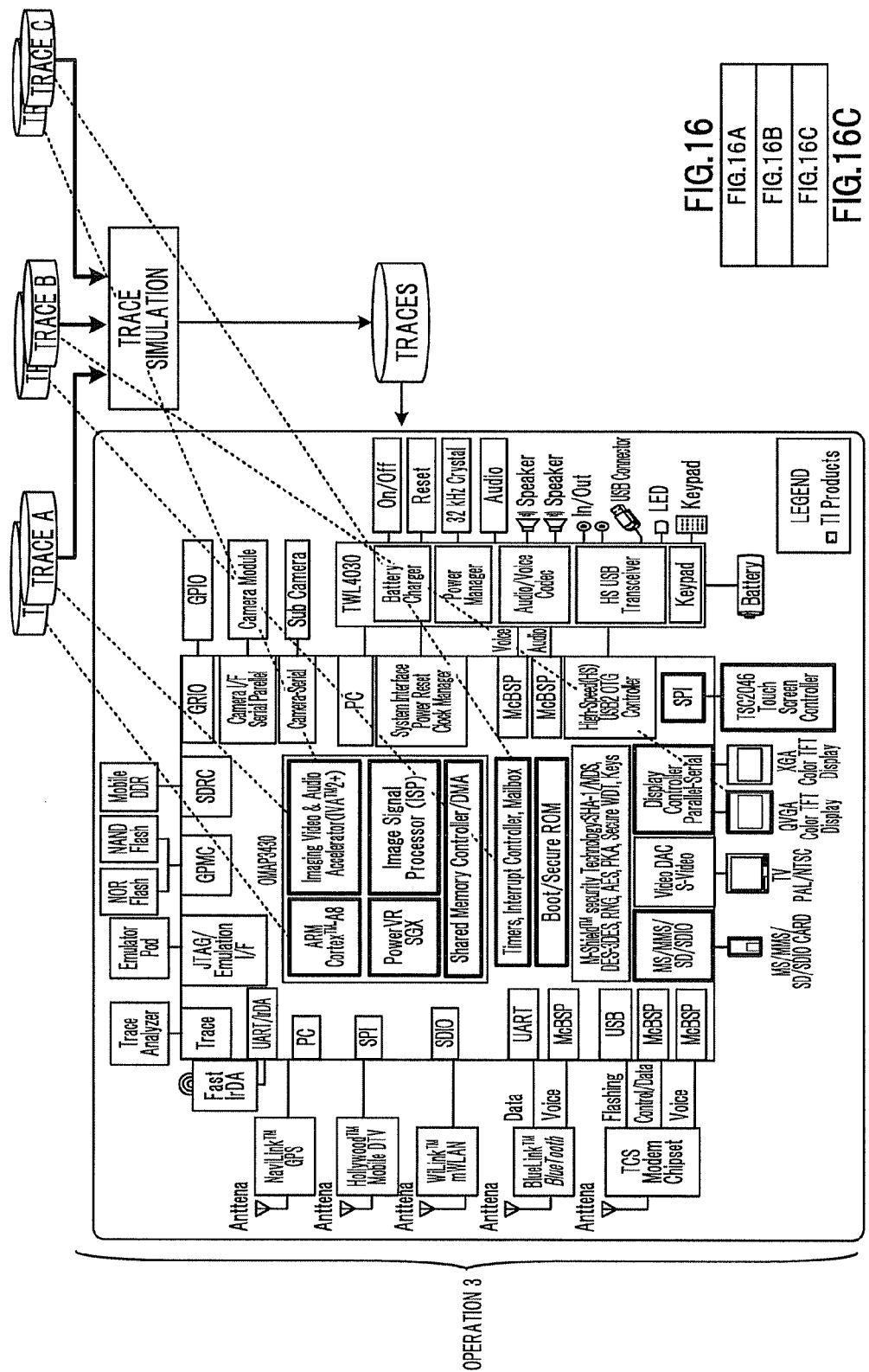

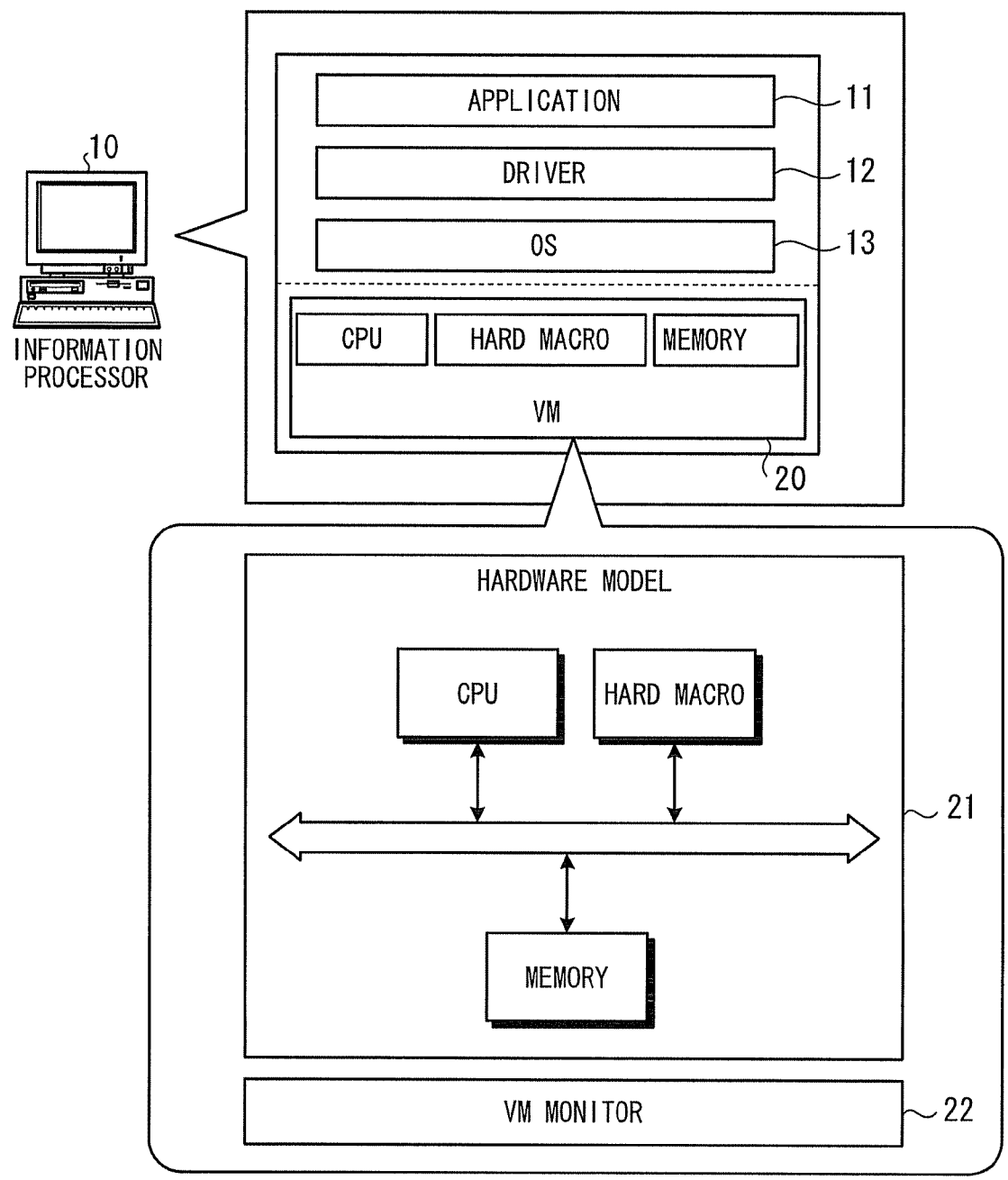

— RELATED ART —

COMPUTER-READABLE RECORDING MEDIUM STORING VERIFICATION SUPPORT PROGRAM, INFORMATION PROCESSOR, AND VERIFICATION SUPPORT METHOD

CROSS-REFERENCE TO RELATED APPLICATIONS

This application is based upon and claims the benefit of priority of the prior Japanese Patent Application No. 2009-054148 filed on Mar. 6, 2009, the entire contents of which are incorporated herein by reference.

BACKGROUND

1. Field

Various embodiments described herein relate to a computer-readable recording medium on which a verification support program for supporting verification of operation(s) of an arbitrary system is stored. The embodiments also relates to an information processor and to a verification support method.

2. Description of the Related Art

When a new system is developed and an application run by an OS (operating system) running on the system is developed, it has been heretofore necessary to evaluate the system itself and the application in terms of performance. In order to evaluate the performance of the application, the hardware environment of the system that runs the application must be taken into consideration. Accordingly, accurate evaluation of the performance cannot be made until the application is run on the system after completion of the development of the assumed system.

Accordingly, in recent years, a technique of making an evaluation of performance using a virtual machine has been offered as disclosed in Japanese Laid-open Patent Publication No. 8-241327. In particular, an application is run on the virtual machine that realizes a hardware environment for an assumed system by means of software without waiting for completion of development of the assumed system. FIG. 17 is a block diagram illustrating the configuration of a typical virtual machine. As shown in FIG. 17, the virtual machine (VM), 20, is realized by executing given software by means of an information processor 10.

The virtual machine 20 has a hardware model 21 that realizes hardware similar to the assumed system by means of software and a virtual machine (VM) monitor 22 for controlling the operation of the hardware devices (in the example of FIG. 17, a CPU, a hard macro, and a memory) implemented by the hardware model 21. The operation of an application 11 may be verified by activating an OS 13 on the virtual machine 20 and a driver 12 compliant with the hardware environment realized by the virtual machine 20.

FIG. 18 is a block diagram illustrating fundamental operations performed by the typical virtual machine. FIG. 18 depicts a procedure for the fundamental operations used when the application 11 is verified using the virtual machine 20. When the application 11 is read into the virtual machine 20, the CPU and hard macro inside the hardware model 21 are made to execute their respective given operations according to the descriptions of the application 11. The memory in the hardware model 21 is appropriately accessed according to the operations of the CPU and hard macro. Thus, data is written and read out.

More specifically, in the case of the CPU, instructions are first fetched from the application 11 (operation S11). The fetched instructions are executed (operation S12). According to the execution of the instructions, the register/memory is updated (operation S14). According to the update operation, a bus access is made (operation S13). When the update operation is completed, time and electric power that would be consumed if the same instructions were executed on a real machine are added (operations S15 and S16). Program control goes back to operation S11, where next instructions are fetched. With respect to the time and power consumption added in operations S15 and S16, values forecasted according to the performance of the real machine and actual measurement values are prepared in advance. These values are added.

Similarly, in the case of the hard macro, an algorithm according to the description of the application 11 is first implemented (operation S21). The register/memory is updated according to the implemented algorithm (operation S22). Then, according to the update process, a bus access is made (operation S23). When the update operation is completed, time and electric power that would be consumed if the same algorithm was implemented on a real machine are added also in this case (operations S24 and S25). Program control goes back to operation S21, where a next algorithm is implemented. With respect to the time and power consumption added in operations S24 and S25, values forecasted according to the performance of the real machine and actual measurement values are prepared in advance. These values are added.

The operations respectively performed by the CPU and hard macro are synchronized with each other under control of the virtual machine (VM) monitor 22. Accordingly, by acquiring the results of the execution of the operations performed by the virtual machine 20 and by obtaining the results of a simulation of cooperative processing between the CPU and hard macro in the same way as where the application 11 is run by the hardware model 21 similarly to when it is run by a real machine, the operations may be verified.

FIG. 19 is a block diagram illustrating verification support operations performed by an application using a typical virtual machine. As described previously, in order to realize a system assumed to support the verification performed by the application 11 using the virtual machine 20, it is essential that a C model creation module 30 refer to a hard macro specification 31 and that a C model 32 which is a simulation model of the hard macro be created.

The application 11 run by the virtual machine 20 cannot be employed unchanged in practice. Therefore, the application is converted into an app binary 42 by a compiler-assembler module 40. Also, it is necessary to create function map information 43 ancillary to the app binary 42. A simulation of the application 11 cannot be run by the virtual machine 20 until these preparations are completed.

The hard macro specification 31 employed to create the C model 32 is also exploited in manufacturing a real chip 60. In this case, an RTL (register transfer level) creation module 50 first creates an RTL statement from the hard macro specification 31. The real chip 60 is fabricated using the created RTL statement/net list 51, the net list being created from the RTL statement. The accuracy of the simulation may be checked by comparing the performance and power consumption obtained when the application 11 is implemented by the fabricated real chip 60 with forecasted performance and power consumption obtained by the simulation performed by the virtual machine 20.

However, in the case of a system under development in practice, there is a possibility that the specifications of the hardware environment are varied and hard macros are added frequently. Therefore, in many cases, it is difficult to prepare the correct hard macro specification 31. Even if the hard macro specification 31 may be prepared, a large amount of time and development cost are consumed to create the C model 32. In order to use the actually created C model 32, a verification work equivalent to designing of the real chip 60 is necessary. As a result, a heavy burden is imposed on the verifier. Consequently, there is the problem that this cannot be adopted as a realistic technique.

With respect to the application 11, the hardware environment for the actually operated system is not established. Therefore, the application often fails to operate normally on the virtual machine 20 if the app binary 42 is used unchanged. Accordingly, the app binary 42 must be modified so as to cope with the hardware environment of the virtual machine 20. There is the problem that as the system becomes more complex and needs more accurate verification, a longer time must be spent in performing a modification operation or actual verification operation.

SUMMARY

In accordance with an aspect of an embodiment, a computer-readable recording medium storing a verification support program, a verification support system and method are provided. The program causes a computer to execute an operation including acquiring a trace group indicating instants of time of execution of processing operations of an arbitrary application running on an arbitrary system and vestiges of contents of the execution, behavior information indicating behaviors of a processor of the arbitrary system running the arbitrary application, and state information indicating state transitions of an arbitrary hardware device other than the processor.

An embodiment includes searching a behavior trace corresponding to a specified behavior from the trace group acquired based on an instant of time of execution of an arbitrary behavior that is specified from behaviors indicated by the behavior information, searching a state trace corresponding to an arbitrary state transition from the trace group acquired based on an instant of time of execution of the arbitrary state transition that is specified from the state transition indicated by the state information, associating the traces found by the searching of the behavior trace and the traces found by the searching of the state trace according to an instruction about an association between operations when the arbitrary behavior and the arbitrary state transition are executed respectively, and outputting the trace group associated as traces for a simulation of the behaviors.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 16 includes FIGS. 16*a*, 16*b*, and 16*c* with explanatory chart(s) illustrating a procedure for application of a processing routine for support of verification performed by a system that executes plural applications;

FIG. 17 is a block diagram illustrating the configuration of a typical virtual machine;

DETAILED DESCRIPTION OF EMBODIMENTS

Figure 1:
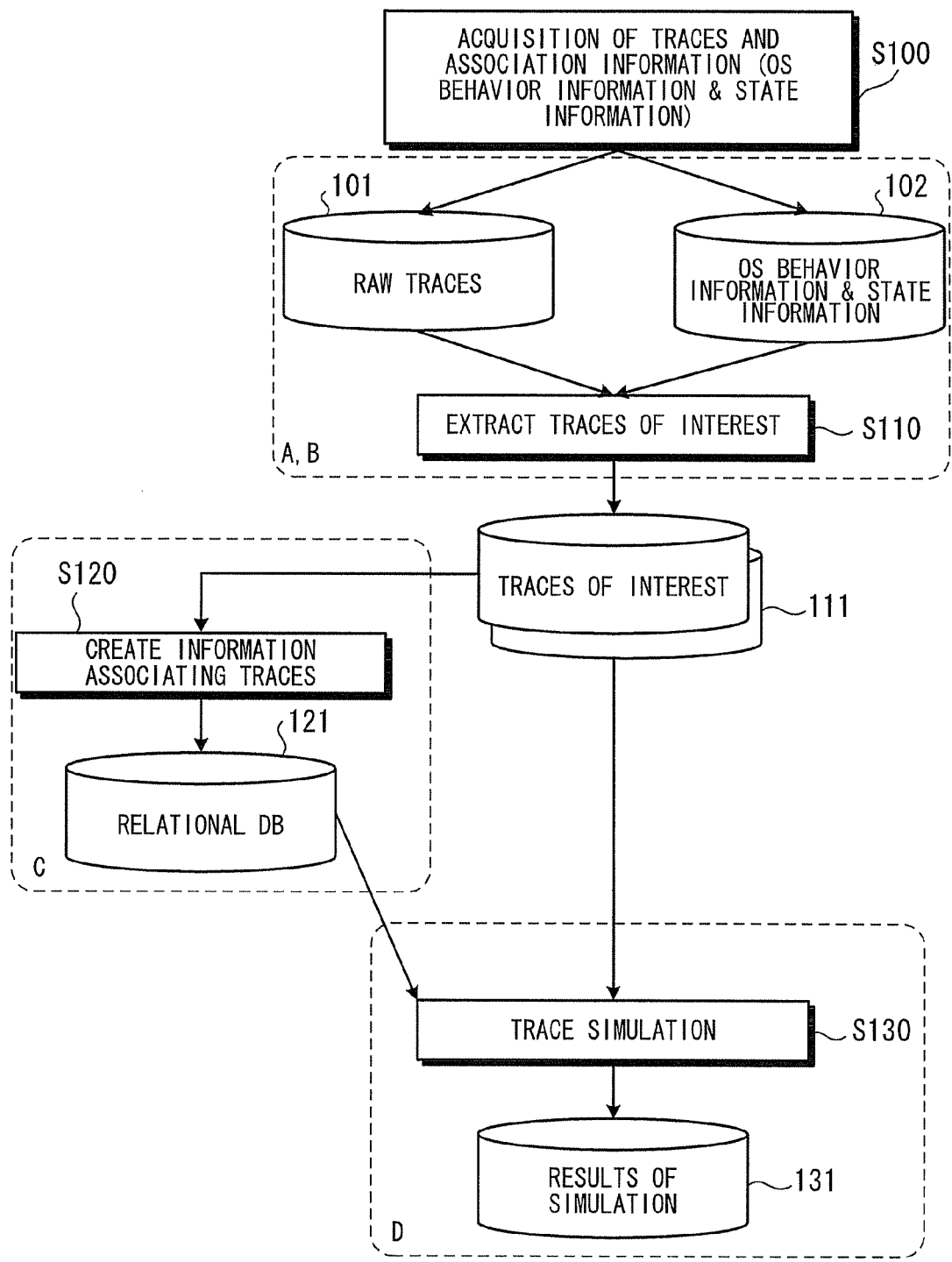
FIG. 1 is a block diagram schematically illustrating processing for assisting a verification according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Embodiments of the invention described herein provide verification support program, information processor, and verification support method which make it possible to evaluate performance of a system or an application of interest (target application) without waiting for completion of a hardware environment, in order to solve the problems with the foregoing related art.

The embodiments of the disclosed technique are hereinafter described in detail with reference to the accompanying drawings. First, traces that are vestiges of execution of an application to be verified when the application is run by an arbitrary hardware device are prepared. Then, only one of the traces that gives a vestige of execution of the application when the application performs a specified processing routine in a desired system is extracted from the prepared traces. Using the extracted trace, a simulation of the application is performed. Making reference to the results of the simulation makes it possible to validate the operation performed where the application performs the processing routine to be verified in the system to be verified. That is, the performance may be evaluated with high accuracy from the design stage in which development of the hardware environment of the system is not yet completed, in a case where the application is run in the system. A specific configuration for realizing such operations is described below.

An outline of a processing routine for support of verification according to an embodiment is first described. FIG. 1 is a block diagram schematically illustrating processing routine for assisting verification according to an embodiment. In the present embodiment, it is not necessary to prepare a virtual machine that faithfully reproduces a system to be verified. In an arbitrary system, a trace group that is raw traces (described in detail later) indicating vestiges of execution of an application to be verified when the application is run is acquired. The arbitrary system for gathering the trace group may have a CPU to be verified and a hard macro associated with the operation.

Unlike the case where an application is run by the system to be verified, a trace group obtained when an application is run by an arbitrary system contains vestiges of execution of processing including other than the operation to be verified and vestiges of execution of the behavior of other hardware device within the arbitrary system. Furthermore, the gathered trace group contains vestiges of execution of a behavior of the OS installed in the arbitrary system. These kinds of information are miscellaneous information that is not necessary to validate the operation of the application in the system to be verified.

Accordingly, in an embodiment, only traces associated with the operation to be verified are appropriately extracted from the trace group, using the information processor. When the extracted traces are operated, reading and return values are associated. A simulation of an operation to be verified is carried out using only the extracted traces. The verifier validates the results of the simulation. In this case, a verification tool or the like may be used. Thus, the performance may be evaluated in a case where an arbitrary application is run in a system (target system) to be verified.

In an embodiment, 4 processing routines A, B, C, and D are performed to realize the aforementioned processing for support of verification.

The processing routine A is extraction of traces corresponding to behavior(s) of a CPU to be verified. The processing routine B is extraction of traces corresponding to a state transition of a hard macro to be verified. The processing routine C is creation of information about associating of the extracted traces. The processing routine D is a trace simulation using the extracted traces.

The information processor performing the processing for assisting verification effects preprocessing for starting the processing routines A and B. The preprocessing including acquiring raw traces 101 that are a trace group gathered by executing an application by means of an arbitrary system and acquiring association information (OS behavior information and state information) 102 derived when the aforementioned application is run (operation S100). The association information 102 indicates the operative conditions of hardware devices in the system such as CPU and hard macro. The association information 102 may be gathered from an arbitrary system that runs an arbitrary application in the same way as the raw traces 101. The arbitrary system for gathering the raw traces 101 and association information 102 may be an environment of a real machine or a software environment created by a virtual machine.

The information processor carries out the processing routine A by extracting traces of interest 111 corresponding to the behavior noticed by the verifier from the raw traces 101 based on the OS behavior information included in the association information 102 acquired in operation S100 (operation S110). The behavior noticed by the verifier is behavior related to the operation to be verified.

Similarly, the information processor carries out the processing routine B by extracting traces of interest 111 corresponding to the state transition noticed by the verifier from the raw traces 101 based on the state information included in the association information 102 acquired in operation S100 (operation S110).

Then, the information processor carries out the processing routine C by creating associating information between traces forming the extracted traces of interest 111 (operation S120). As already described in connection with the processing routines A and B, the traces of interest include traces indicating the behaviors of the CPU and traces indicating the transition of the state of the hard macro. Accordingly, the associating information between the traces is information indicating linkage such as whether the state transition of the hard macro has varied in response to the behaviors of the CPU. The traces of interest 111 themselves are vestiges of execution performed by the application run by an arbitrary system. Therefore, the traces 111 may contain operations other than the operation to be verified or a call from other hardware device. Consequently, the CPU and hard macro are not always directly associated with each other.

Accordingly, in the processing procedure C, the information processor creates associating information such that the extracted traces of interest 111 operate seamlessly by receiving an associating instruction between the traces from the outside. The associating information created in operation S120 is stored in an associating database (DB) 121.

Finally, the information processor carries out the processing routine D by performing a trace simulation of the operation to be verified by the verifier by employing the traces of interest 111 to be extracted by the processing routines A and B and the associating database 121 in which the associating information created in the processing routine C is stored (operation S130). As described previously, the corresponding relationship between the CPU and the hard macro may not be correctly established between the traces of interest 111 and so the information processor performs a trace simulation of the traces of interest 111 by referring to the associating information stored in the associating database 121.

In this way, use of the processing for support of verification according to an embodiment makes it possible to evaluate performance of a system at an early stage where the hardware environment for the system to be verified is under development or at a design stage where the specifications of the real machine are not yet established. Specific configuration and operations for realizing the processing for support of verification according to an embodiment are hereinafter described in turn.

Figure 2:
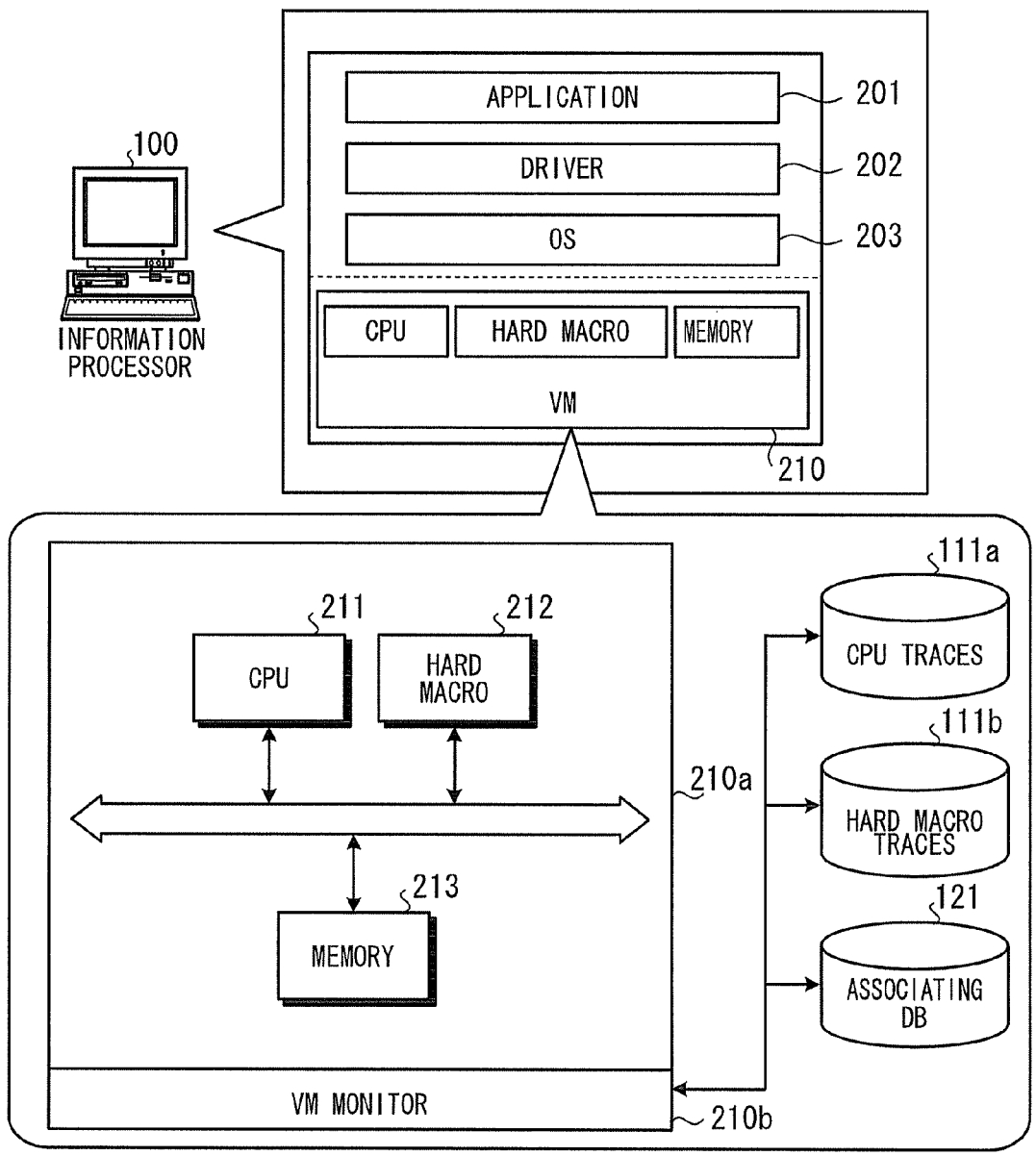
FIG. 2 is a block diagram illustrating the configuration of a virtual machine realized by an information processor according to an embodiment.

The configuration of a virtual machine constituted by the information processor 100 according to an embodiment is next described. FIG. 2 is a block diagram illustrating the configuration of the virtual machine realized by an information processor according to an embodiment. In an embodiment, it is not necessary to faithfully reproduce the hardware environment for the system to be verified by the virtual machine. It suffices to gather traces produced when an arbitrary application is run under a similar hardware environment. Then, it is possible to obtain results of a simulation depicting a state in which the application is run as if on the system to be verified, by processing the gathered traces (e.g., the traces are extracted and associated).

Accordingly, a virtual machine (VM) 210 realized by the information processor 100 according to an embodiment may have a hard macro called from the CPU by an operation to be verified. Thus, an embodiment, the virtual machine 210 may be made up of a hardware model 210a and a virtual machine monitor 210b as shown in FIG. 2. The hardware model 210a has a CPU 211, a hard macro 212, and a memory 213. The virtual machine 210 has a storage module in which traces of interest (CPU traces 111a and hard macro traces 111b) are stored as information for processing traces. The machine 210 further includes the associating database 121.

An application to be operated (i.e., to be verified) by the system to be verified is used as the application 201 run on the virtual machine 210. It is only necessary that the driver 202 and OS 203 correspond to the hardware model 210a of the virtual machine 210.

Figure 3:
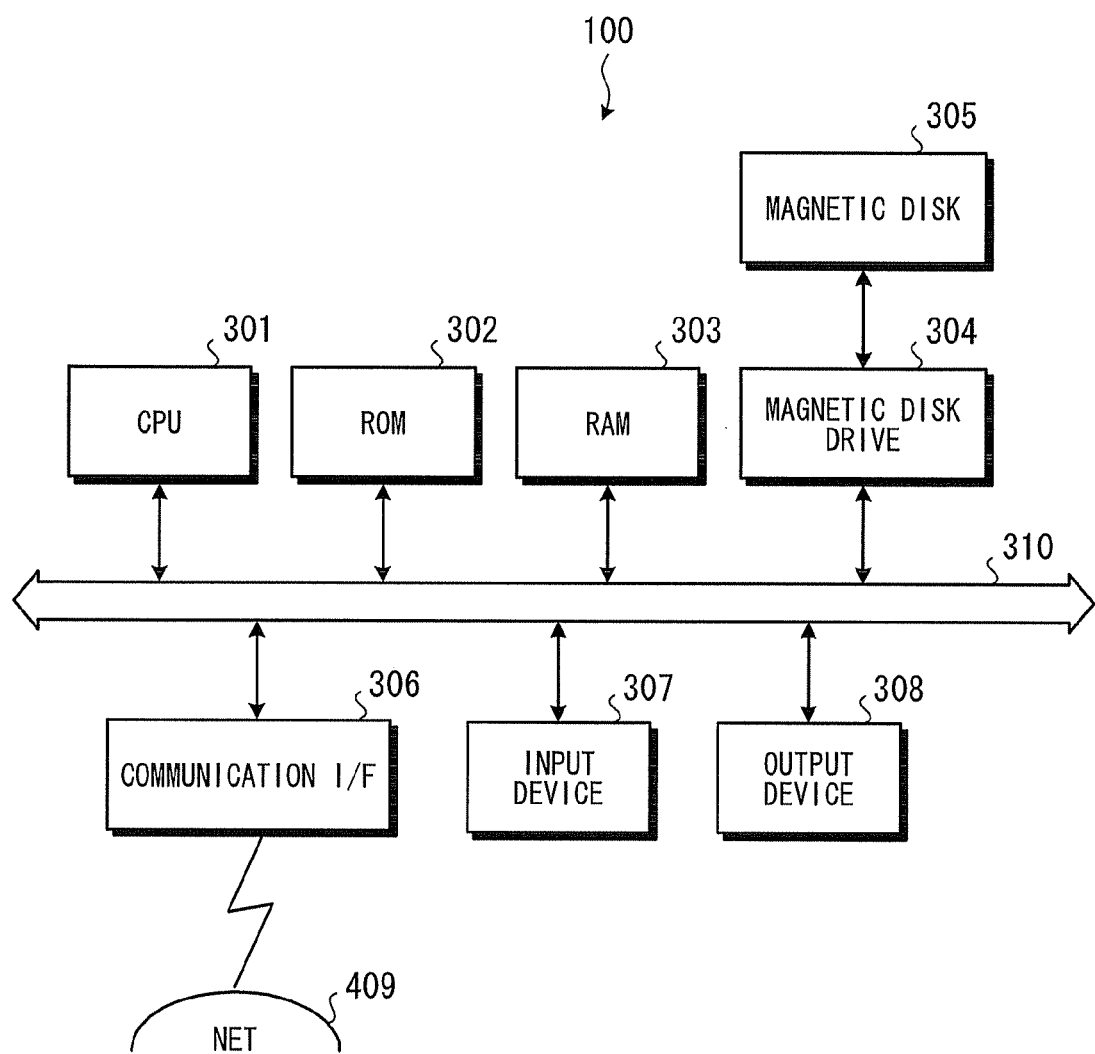
FIG. 3 is a block diagram illustrating a hardware configuration of an information processor.

First, the hardware configuration of the information processor according to an embodiment is described. FIG. 3 is a block diagram showing the hardware configuration of the information processor 100. In FIG. 3, the information processor 100 has a CPU (central processing unit) 301, a ROM (read-only memory) 302, a RAM (random access memory) 303, a magnetic disk drive 304, a magnetic disk 305, a communication interface (I/F) 306, an input device 307, and an output device 308. These components are interconnected via a bus 310.

The CPU 301 controls the whole information processor 100. The ROM 302 stores various kinds of programs including a boot program and a verification support program for realizing processing for support of verification according to an embodiment. The RAM 303 is used as the work area of the CPU 301. The magnetic disk drive 304 controls an operation for updating data held on the magnetic disk 305 or an operation for making reference to the data on the disk under control of the CPU 301. The magnetic disk 305 stores data written in under control of the magnetic disk drive 304. The hardware configuration of FIG. 4 uses the magnetic disk 305 as a storage medium. Other storage medium such as an optical disk or a flash memory may also be used.

The communication I/F 306 is connected with a network (NET) 409 such as a LAN (local area network), a WAN (wide area network), or the Internet. The I/F 306 is connected with other information processor 100 or other external device via the network 409. The communication I/F 306 controls the network 409 and the internal interface and provides control of input and output of data to and from the external device. A modem, a LAN adapter, or the like may be used as the communication I/F 306.

The input device 307 accepts inputs into the information processor 100 from the outside. The input device 307 may be made of a keyboard or mouse. The application 201 that performs a simulation through the information processor 100 as shown in FIG. 2 may be previously stored in a storage area of the ROM 302, RAM 303, or magnetic disk 305. Alternatively, the application may be input through the input device 307 and loaded into the storage area.

Where the input device is a keyboard, it has keys for inputting, for example, of alphanumeric characters, numerals, and various instructions, and performs inputs of data. The input device may also be a touch-panel pad or tenkey. Where a mouse is used as the input device, the cursor is moved, a range is selected, a window is moved, or its size is modified. If a pointing device having a similar function is available, a trackball or joystick may also be used.

The output device 308 outputs data arranged in the information processor 100 or the results of execution of a simulation. The output device 308 may be made of a display device, printer, or the like.

Where the output device is made of a display device, it displays data, for example, about text, image, and functional information, as well as a cursor, icons, and tool boxes. Furthermore, a CRT, TFT liquid crystal display, plasma display, or the like may be used as the display device. Where the output device is a printer, it prints image data and textural data, for example. In addition, a laser printer or ink jet printer may also be adopted. While specific components of the information processor 100 are described herein, the present invention is not limited thereto.

Figure 4:
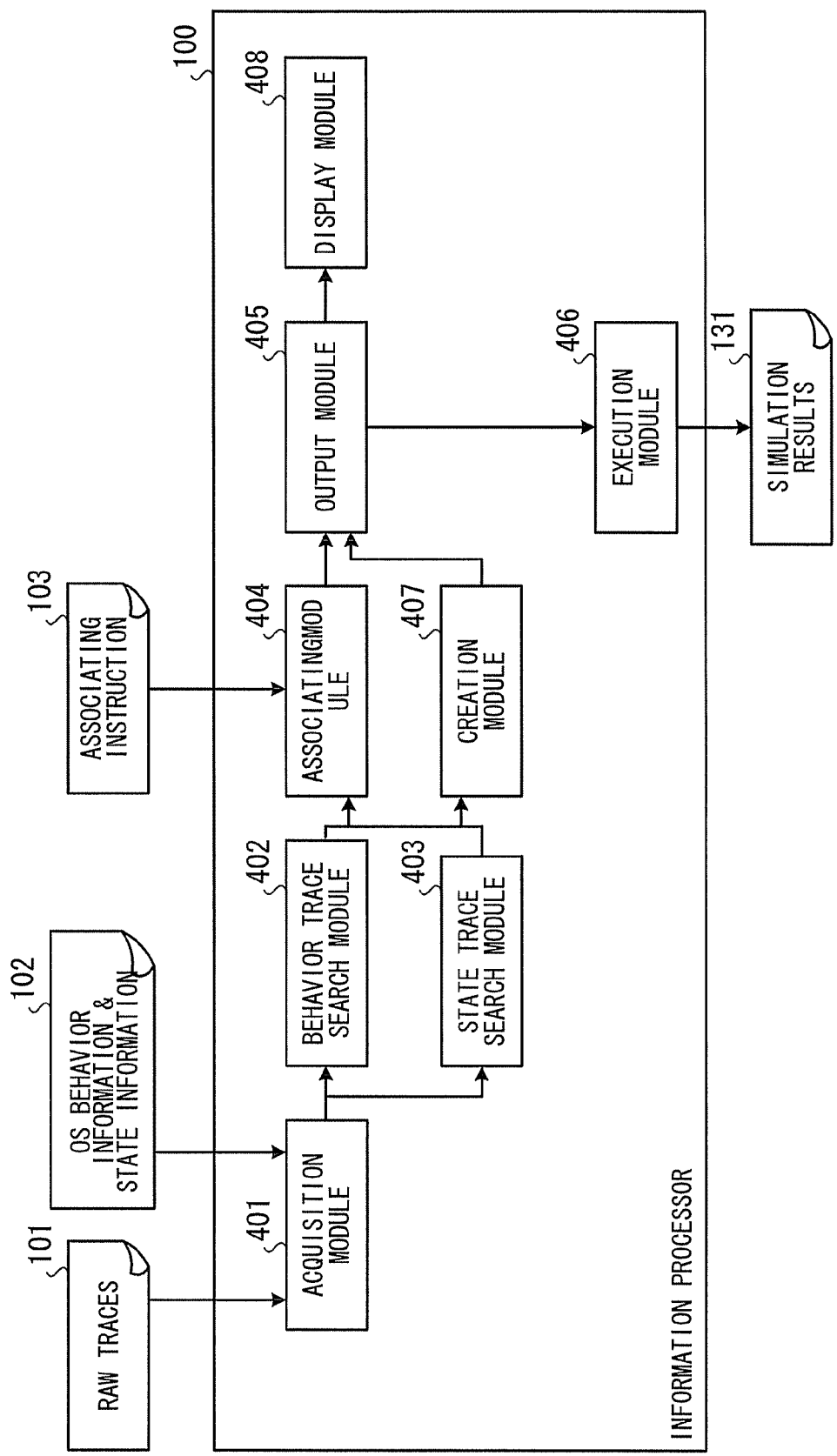
FIG. 4 is a block diagram illustrating a functional configuration of an information processor.

The functional configuration of the information processor 100 is next described. FIG. 4 is a block diagram showing a functional configuration of the information processor. As shown in FIG. 4, the information processor 100 includes an acquisition module 401, a behavior trace search module 402, a state trace search module 403, an associating module 404, an output module 405, an execution module 406, a creation module 407, and a display module 408. The functions of the control module including the acquisition modules 401 to display module 408 are realized by causing the CPU 301 to execute a verification support program stored in the storage region of the ROM 302, RAM 303, or magnetic disk 305 as shown in FIG. 3 or by means of the communication I/F 306.

The acquisition module 401 has a function of acquiring the raw traces 101 and OS behavior information and state information 102. As described previously, the raw traces 101 are a trace group indicating an instant of execution of each processing operation performed by the CPU 211 or a hard macro other than the CPU 211 and vestiges of the contents of the execution in a case where an arbitrary application is run on an arbitrary system. In the case of raw traces of the contents of an execution performed by the hard macro other than the CPU 211, all the vestiges of the contents of the execution of each operation block run at the same instant of time within the hard macro are contained. The OS behavior information 102a indicates behaviors of the CPU 211 within the system in a case where the aforementioned arbitrary application is run. The state information 102b indicates state transitions of each operation block within the hardware device other than the CPU, or hard macro, within the system called from the CPU 211 by execution of the arbitrary application in a case where the arbitrary application is run in the same way.

The acquired raw traces 101 and the OS behavior information and state information 102 are once stored in the storage region of the RAM 303 or magnetic disk 305. The information acquired by the acquisition module 401 may be obtained from the results of execution of an arbitrary application performed by a real machine having a hardware environment close to that of the system that is assumed to be a verified system. Furthermore, the results of execution arising when an arbitrary application is run by other virtual machine may be acquired.

The behavior trace search module 402 has a function of searching the trace group acquired as the raw traces 101 for traces corresponding to a specified arbitrary behavior based on the instant of time of execution of the arbitrary behavior if such arbitrary behavior is specified from behaviors indicated by the OS behavior information.

If an arbitrary state transition is specified from state transitions indicated by the state information, the state trace search module 403 searches the trace group acquired as the raw traces 101 for traces corresponding to the arbitrary state transition based on the instant of time of execution of the arbitrary state transition.

The traces found by the search made by the behavior trace search module 402 and state trace search module 403 are once stored in a storage region of the RAM 303 or magnetic disk 305 and preserved as extracted traces of interest 111.

The behavior trace search module 402 and state trace search module 403 accept instructions about behaviors to be noticed and state transitions independently. They may be so designed that if certain behaviors are specified, state transition(s) corresponding to the behaviors are automatically specified. In this configuration, a transition identification module (not shown) is prepared. If arbitrary behaviors are specified by the behavior trace search module 402, the transition identification module identifies hardware state transitions corresponding to the arbitrary behaviors. The state trace search module 403 searches for traces corresponding to the state transitions which are extracted from the raw traces 101 and have been identified, based on the instant of time of execution of the state transitions identified by the identification module.

The associating module 404 has a function of associating the traces found by the behavior trace search module 402 in response to an instruction about association between each operation to the traces found by the state trace search module 403 when the instruction about the association of each operation in a case where the arbitrary behavior and arbitrary state transitions are executed is received. The information about the association between the traces associated by the associating module 404 is stored as associating information in a storage region of the RAM 303 or magnetic disk 305.

The output module 405 has a function of causing the trace group associated by the associating module 404 to be output as dedicated traces (traces of interest 111) for performing a simulation of behaviors. The output traces are once stored in a storage region of the RAM 303 or magnetic disk 305.

The execution module 406 has a function of executing a simulation of arbitrary behaviors using traces for simulation, the traces being output by the output module 405. The information processor 100 described in connection with FIG. 4 has the execution module 406 and may carry out a simulation of a desired operation within the information processor 100. The functions of the execution module 406 may be realized by an external device. Where the functions of the execution module 406 are prepared outside, the information processor 100 may be offered as an apparatus for creating trace group for a simulation. The processing performance that the apparatus is required to exhibit may be set lower by assigning functions to different devices in this way. In addition, the simulation may be performed using the existing apparatus.

The information processor 100 accepts instructions 103 about association between the traces corresponding to the behaviors of the CPU from the verifier and the traces corresponding to the state transitions of the hard macro. The processor 100 may have a function of assisting inputting of the verifier's associating instructions 103. In the case of FIG. 4, the processor has a function of creating graphs (call graph and state graph as described in detail later) indicating the state of each trace by means of the creation module 407.

The creation module 407 has a function of creating a call graph that makes each trace found by the behavior trace search module 402 correspond to function information read out by the trace. Furthermore, the creation module 407 has a function of creating a state graph which makes each trace found by the state trace search module 403 correspond to state information caused to make a transition in the trace. The created call graph and state graph are once stored in a storage region of the RAM 303 or magnetic disk 305 and then output to the output module 405, where the graphs are offered to the verifier.

Information may be offered to the verifier to facilitate grasping a corresponding relation between the traces by creating the graphs from the extracted traces. As a result, verifier's input operations about associating instructions are assisted. Consequently, the burden on the verifier is alleviated.

The display module 408 displays information output by the output module 405 by means of a display device that may be connected with the information processor 100. Where a display device is prepared as the output device 308 of the information processor 100, the information may be displayed using the display device as the output device 308. Information displayed by the display module 408 includes the trace group (traces of interest 111) found by the behavior trace search module 402 and the state trace search module 403, call graph and state graph created by the creation module 407, and the results of simulation 131 performed by the execution module 406.

As described so far, the information processor 100 has the functional modules (from acquisition module 401 to display module 408) for performing a simulation where a focus is placed on the operation to be verified after processing traces, in addition to the functional modules for realizing the virtual machine 210.

Operations performed by the information processor 100 to perform the processing routines A-D already described in connection with FIG. 1 are next described in detail.

Figure 5:
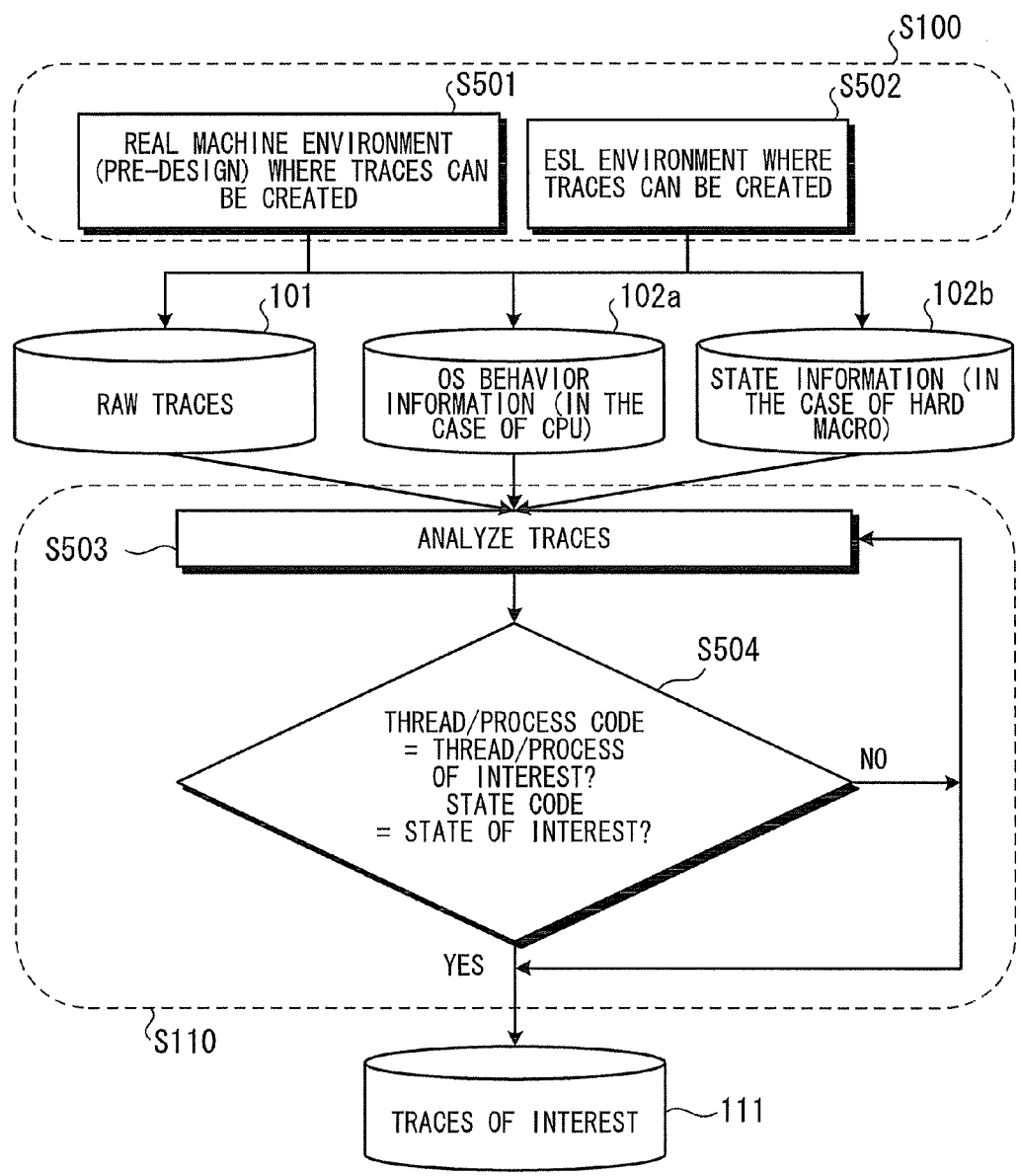
FIG. 5 is an explanatory chart illustrating processing for extracting traces of interest.

First, the processing routines A and B illustrated in FIG. 1 are described. These processing routines are used to extract traces associated with processing to be verified from the raw traces 101, the extracted traces being treated as the traces of interest 111. FIG. 5 is an explanatory chart illustrating processing for extracting traces of interest. As shown in FIG. 5, the information processor 100 realizes either a real machine environment in which traces may be created (operation S501) or an electronic system level (ESL) environment in which traces may be created (operation S502) as a preprocessing operation (operation S100) prior to extraction of the traces of interest 111. The raw traces 101, OS behavior information 102a, and state information 102b are gathered from the results of execution of an application in the environment. The ESL environment is an operating environment realized by a software model created by ESL design. In the case of ESL design, the operation of a system may be represented using a high-level language such as C++. The system is modeled. The components of the software/hardware may be stipulated.

Then, the information processor 100 analyzes traces to extract the traces of interest 111 (operation S503). The analysis of the traces includes operations for reading data about the acquired raw traces 101, OS behavior information 102a, and state information 102b and searching for traces corresponding to the operation specified as an object to be verified while referring to the OS behavior information 102a and state information 102b.

Figure 6:
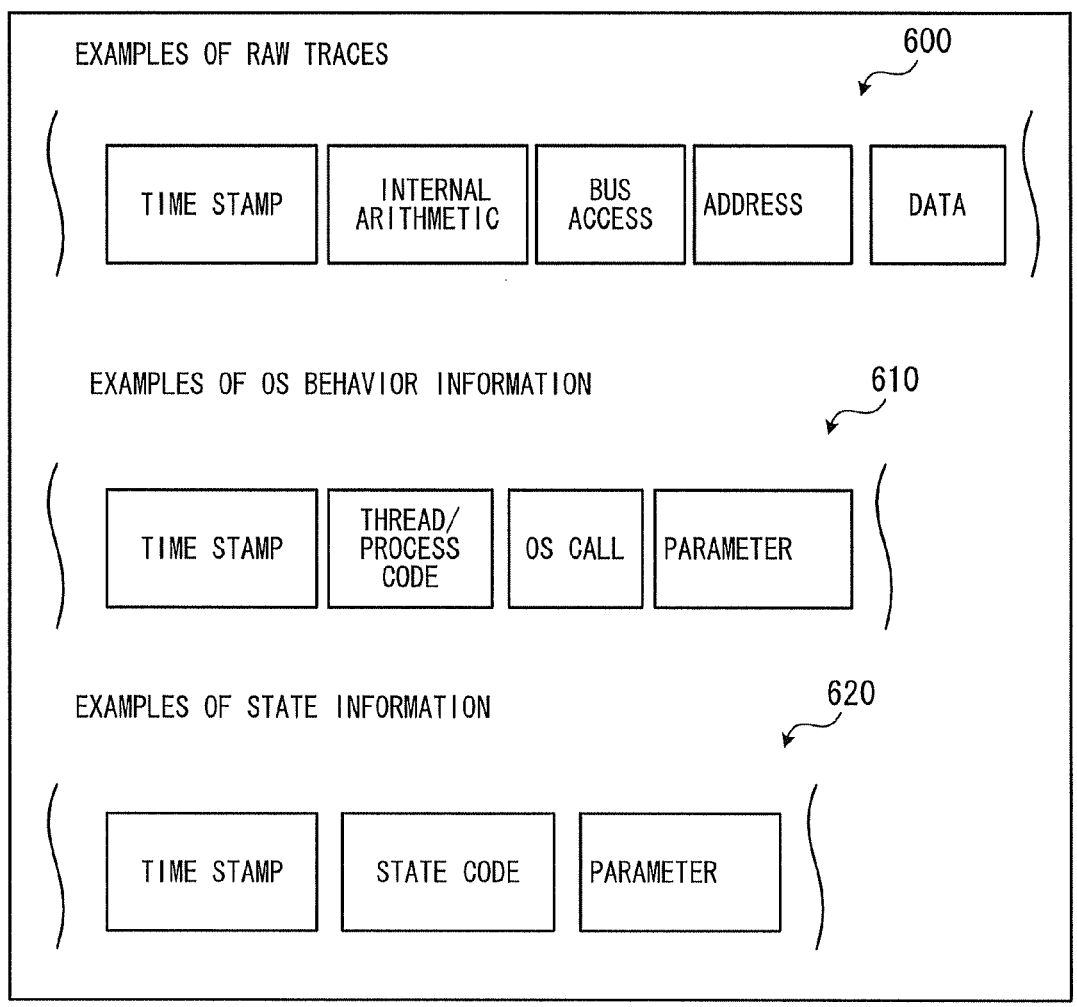
FIG. 6 illustrates configurations of raw traces, CPU behavior information, and state information.

FIG. 6 illustrates the configurations of raw traces, CPU behavior information, and state information. The raw traces 101 acquired in operation S100 are a set of data including a string of data 600. Similarly, the OS behavior information 102a acquired in operation S100 is a set of data including a string of data 610. The state information 102b acquired in operation S100 is a set of data including a string of data 620.

Where traces corresponding to the behaviors of the CPU are searched for, designation of thread/process of interest is accepted in operation S503. Alternatively, a task of interest may be accepted. Similarly, where traces corresponding to a state transition of a hard macro are searched for, designation of a state of interest is accepted in operation S503.

If a thread/process of interest and a state of interest are specified in operation S503, a decision is made as to whether they are coincident with the thread/process code and state code in the acquired OS behavior information 102a and state information 102b (operation S504). If they are not coincident (No at operation S504), program control returns to operation S503, where a next trace is analyzed. If the decision at operation S504 is Yes (i.e., they are coincident with the thread/process code and state code in the OS behavior information 102a and state information 102b), the processor searches the raw traces 101 for traces corresponding to the time stamp in the coincident OS behavior information 102a and state information 102b and extracts the traces as the traces of interest 111. Specific examples of extraction of traces using OS behavior information 102a and extraction of traces using the state information 102b are given below.

Figure 7:
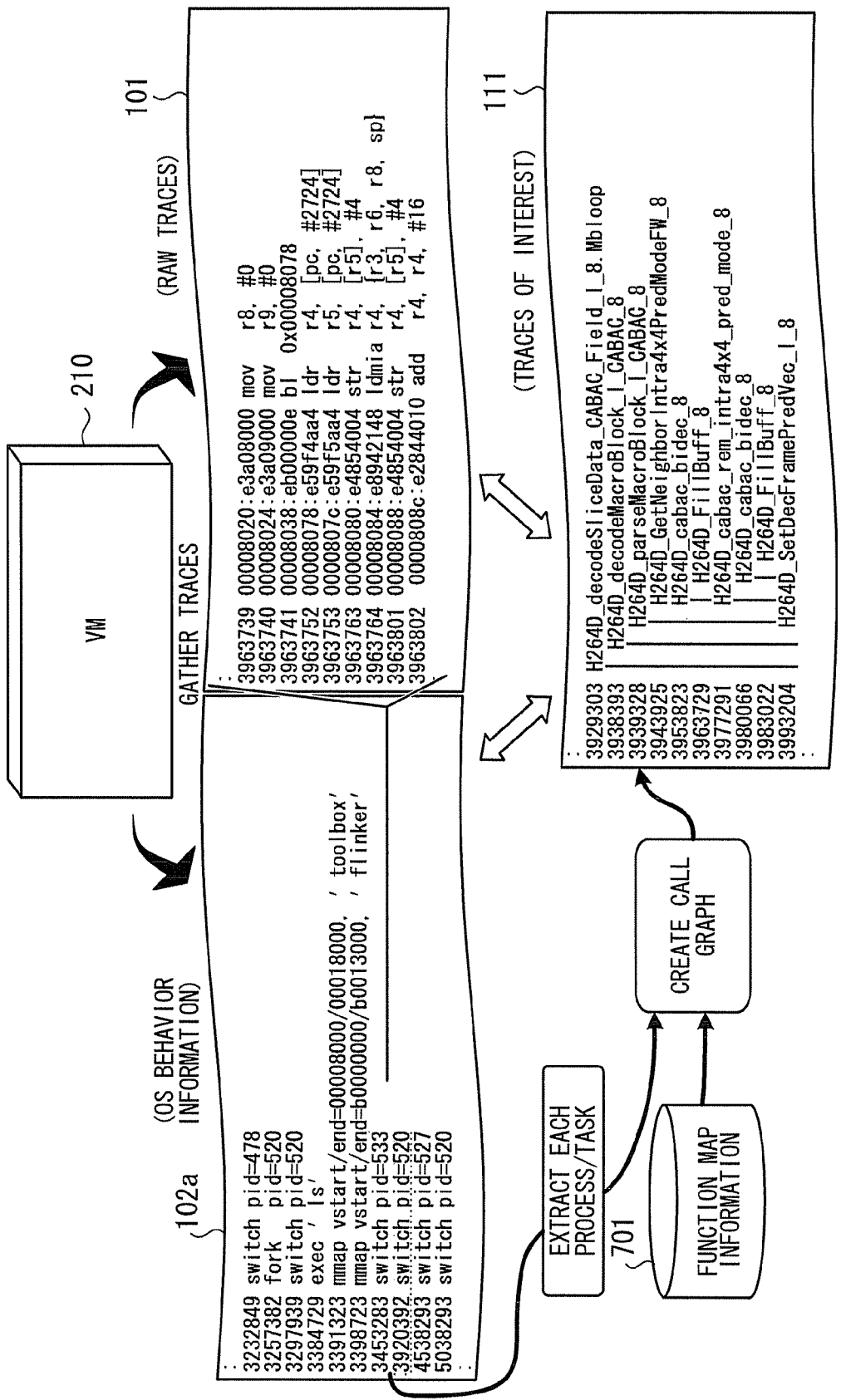
FIG. 7 is an explanatory chart illustrating an example of extraction of traces (CPU)

FIG. 7 is an explanatory chart illustrating an example of extraction of traces (CPU). For instance, raw traces 101 and OS behavior information 102a are gathered from the hardware model 210a reproduced by the virtual machine (VM) 210. As shown in FIG. 7, if the processor takes notice of a pid (process ID)=520, it refers to a time stamp 3920392. The processor then extracts traces existing between the time stamp 3920392 and the time stamp 4538293 of the next process operation from the raw traces 101 for each unit of process/task.

Then, a call graph is created using function map information 701 containing the settings of function names corresponding to addresses described in the OS behavior information. Thereafter, the graph is offered as the traces of interest 111. The extracted traces of interest 111 may be visualized in units of some amount (in the example of FIG. 7, in units of functions) along the time axis as shown in FIG. 7 and offered.

Figure 8:
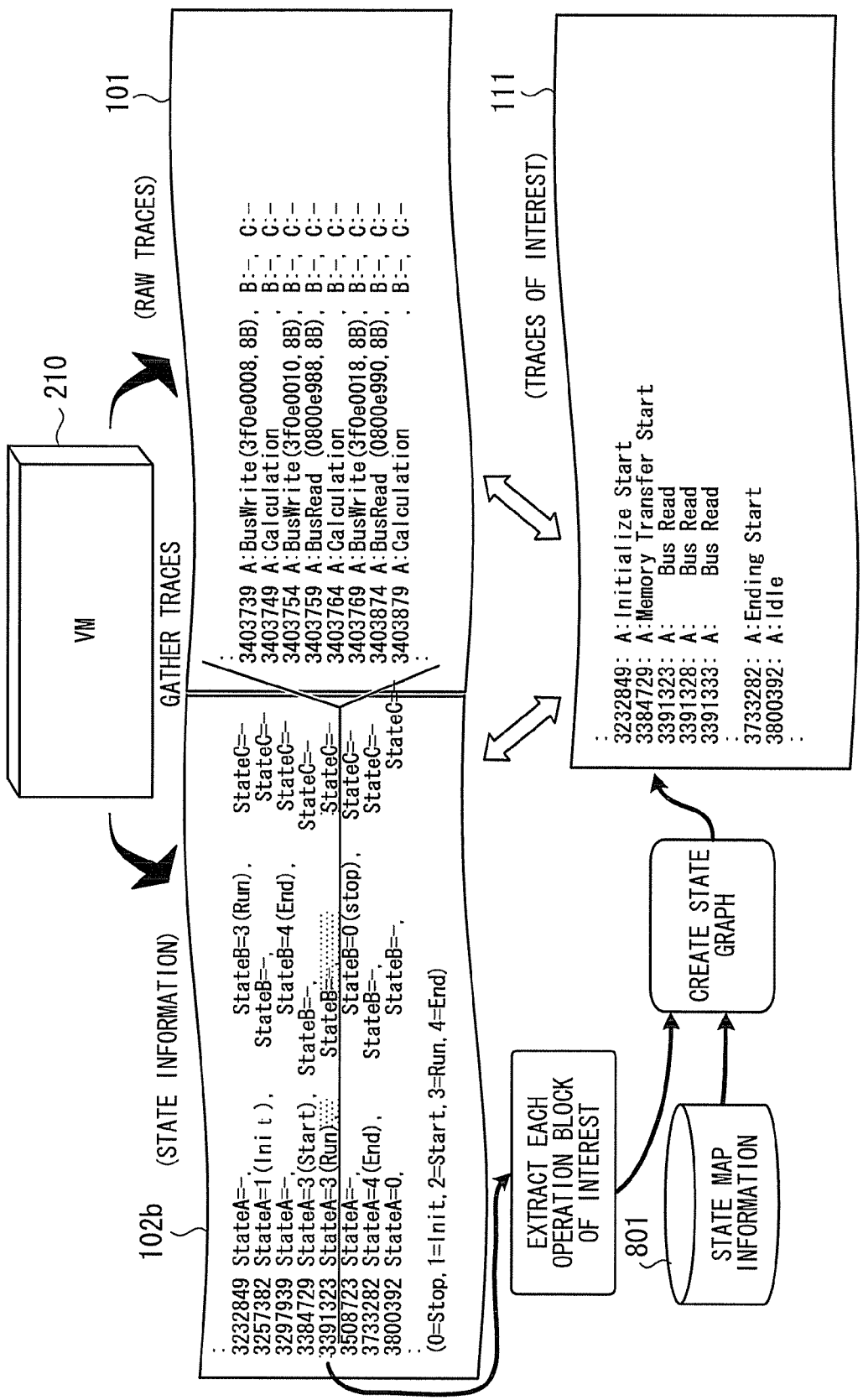
FIG. 8 is an explanatory chart illustrating an example of extraction of traces (hard macro)

FIG. 8 is an explanatory chart illustrating an example of extraction of traces (hard macro). For example, raw traces 101 and state information 102b are gathered from the hardware model 210a reproduced by the virtual machine (VM) 210. When an internal operation block A and a corresponding state A=3 (Run) are noticed as shown in FIG. 8, a time stamp 3391323 is referred to. Traces existing between the time stamp 3391323 and the next time stamp 3508723 (time stamp when the state varied next) are extracted from the raw traces 101 regarding the operation block A of interest.

Then, a state graph is created using state map information 801 containing the settings of state names corresponding to state codes described in the state information. Then, the graph is offered as the traces of interest 111. The extracted traces of interest 111 may be hierarchized and visualized in units of some amount along the time axis as shown in FIG. 8.

Figure 9:
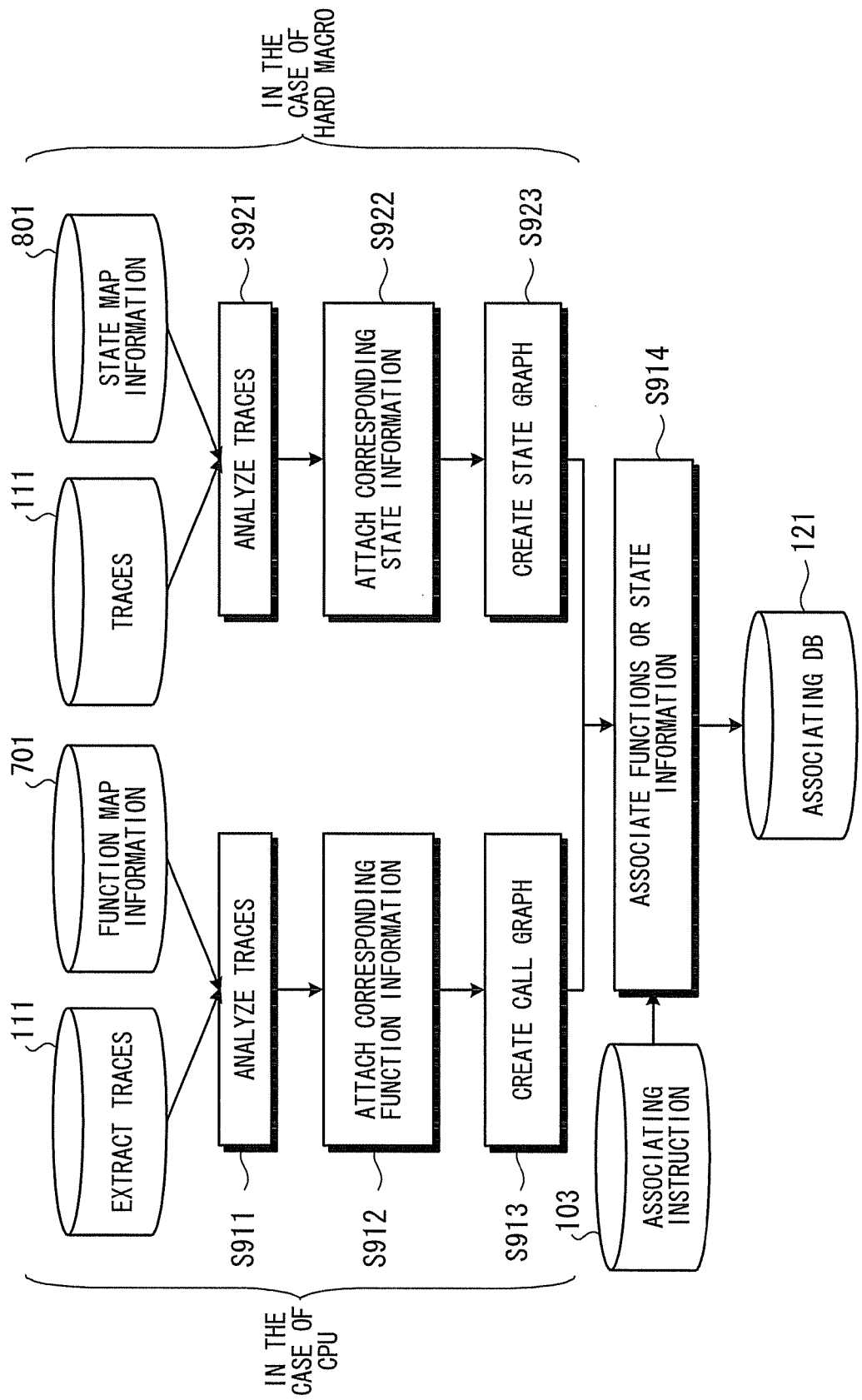
FIG. 9 is an explanatory chart illustrating a processing for trace associating.

The processing routine C for associating traces as already described in connection with FIG. 1 is next described. FIG. 9 is an explanatory chart illustrating the processing routine for trace association. Processing operations S911-S913 illustrated in the left half of FIG. 9 indicate operation(s) for causing the traces of interest 111 described in connection with FIG. 7 to be offered as a call graph. Similarly, processing operations S921-S923 illustrated in the right half indicate operations for causing the traces of interest 111 described in connection with FIG. 8 to be offered as a state graph. The verifier inputs an associating instruction 103 about each trace after comparing the created call graph and state graph.

Figure 10:
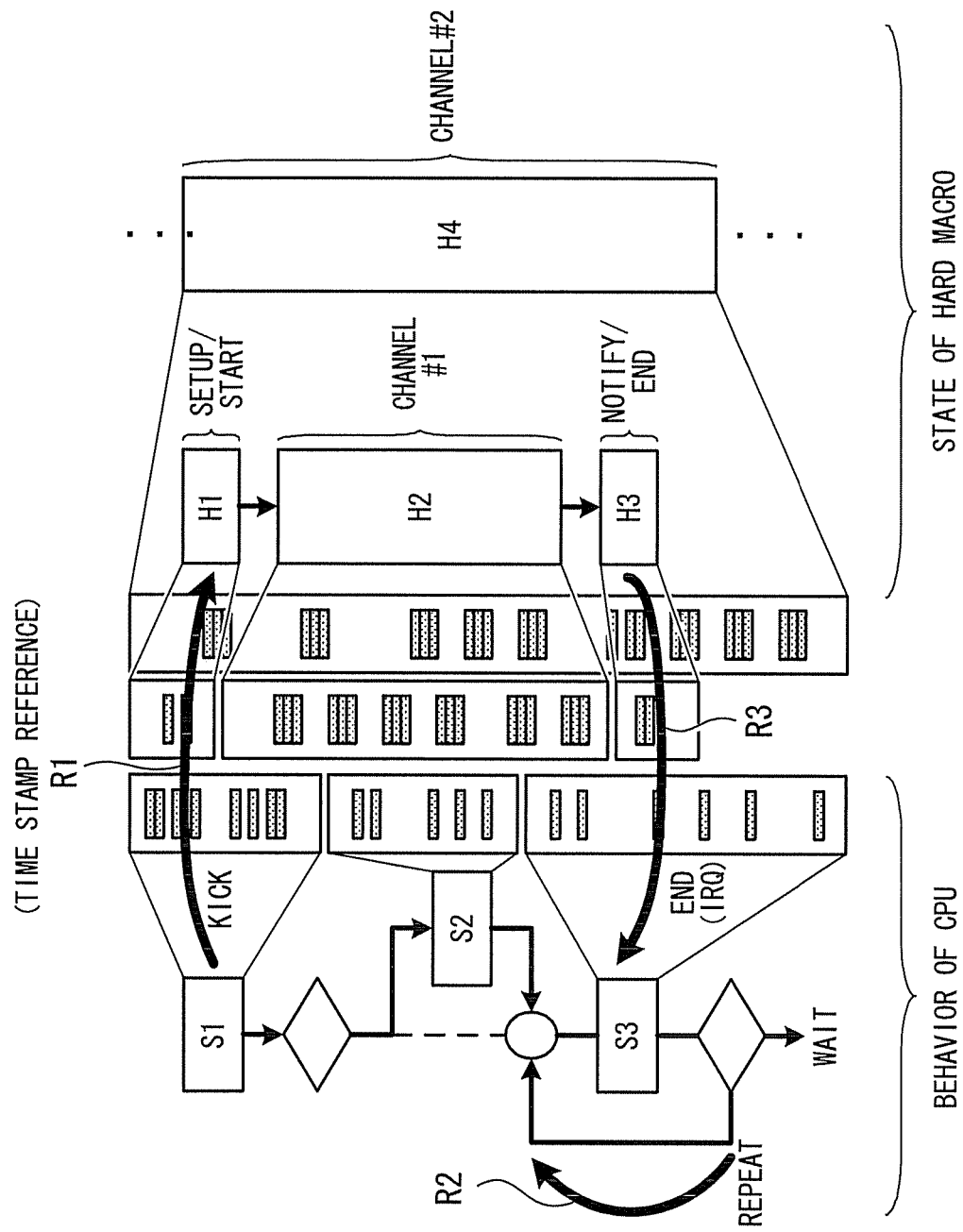
FIG. 10 is an explanatory chart illustrating an example in which trace associating is set.

FIG. 10 is an explanatory chart illustrating an example in which trace associating is set. As shown in FIG. 10, the information processor 100 is capable of visually offering operations represented in terms of a call graph and a state graph based on the instants of time stamps. Accordingly, the verifier compares the CPU behaviors and the state of the hard macro and sets associated locations of operations. For example, in the example of FIG. 10, an instruction is issued for associating R1 of a state variation [setup/start] of the hard macro H1 that is a treated subject of behavior [Kick] at operation S1 of the CPU. Similarly, in the example of FIG. 10, the verifier issues associating instructions R2 and R3.

Referring back to FIG. 9, when an associating instruction 103 is entered, the processor associates functions or state information (operation S914) and stores the results of the association in the associating DB 121 according to the entered instruction.

Figure 11:
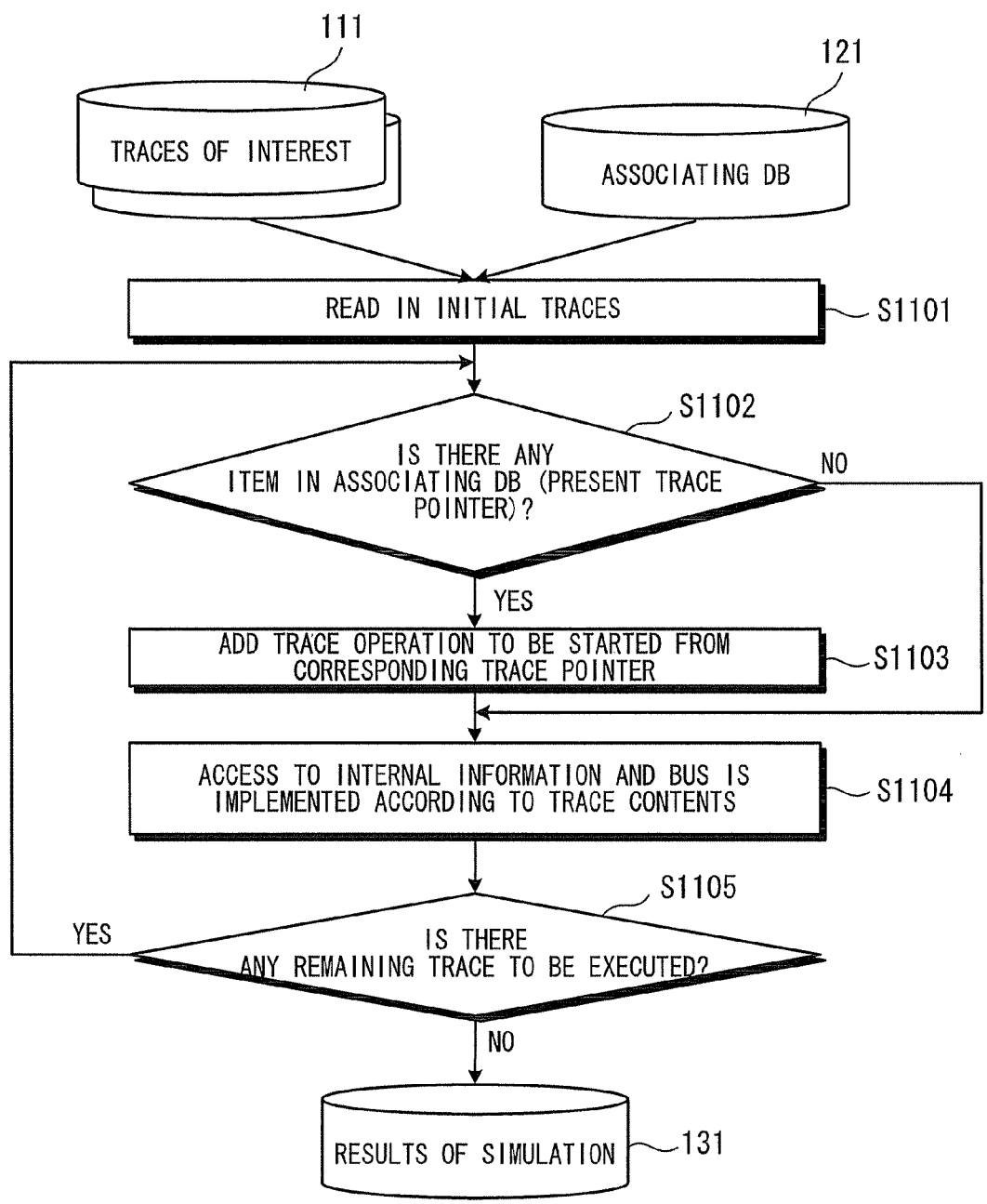
FIG. 11 is a flowchart illustrating a processing routine for executing a trace simulation.

Finally, the processing routine D for a simulation of traces already described in connection with FIG. 1 is described. FIG. 11 is a flowchart illustrating a processing routine for executing a trace simulation. As illustrated in FIG. 11, the information processor 100 refers to the extracted traces 111 and associating database 121 and reads in initial traces (operation S1101).

Figure 12:
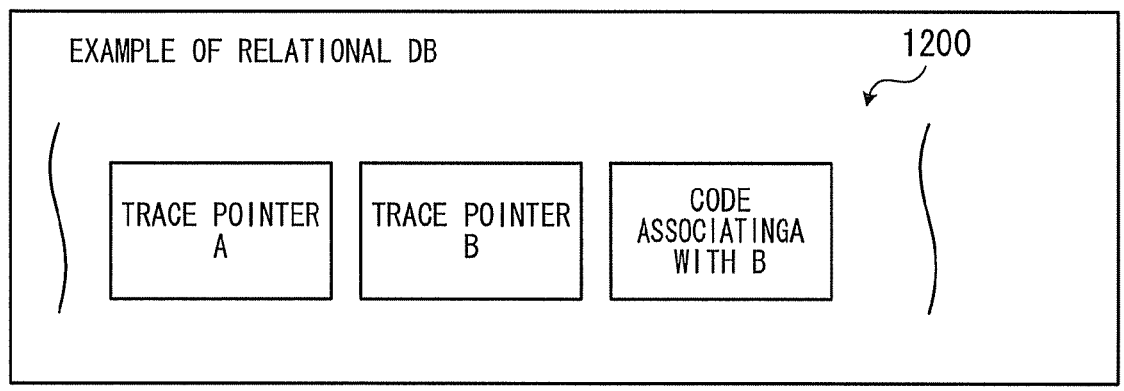
FIG. 12 is an explanatory chart illustrating an example in which associating information is entered from an associating database.

Then, the information processor 100 refers to the associating database 121 and makes a decision as to whether or not the [present trace pointer] contains any item to be processed (operation S1102). FIG. 12 is an explanatory chart illustrating an example in which associating information is entered from the associating database. The associating information read in from the associating database 121 includes data such as a string of data 1200. Therefore, if the decision at operation S1102 is Yes (i.e., there is any item to be processed), the information processor 100 adds a trace operation to be started from the corresponding trace pointer (operation S1103).

The information processor 100 implements access to the internal information and the bus according to the trace contents (operation S1104). If the decision at operation S1102 is No (i.e., there is no remaining item to be processed), program control also proceeds to operation S1104.

On completion of operation S1104, the information processor 100 makes a decision as to whether the traces of interest 111 contain a remaining trace to be executed (operation S1105). If the decision at operation S1105 is Yes (i.e., there is any remaining trace to be executed), program control goes back to operation S1102, where the information processor 110 executes the remaining trace contents. If the decision at operation S1105 is No (i.e., there is no remaining trace), it is determined that the trace simulation using the traces of interest 111 is completed. The information processor 100 outputs results of simulation 131.

Figure 13:
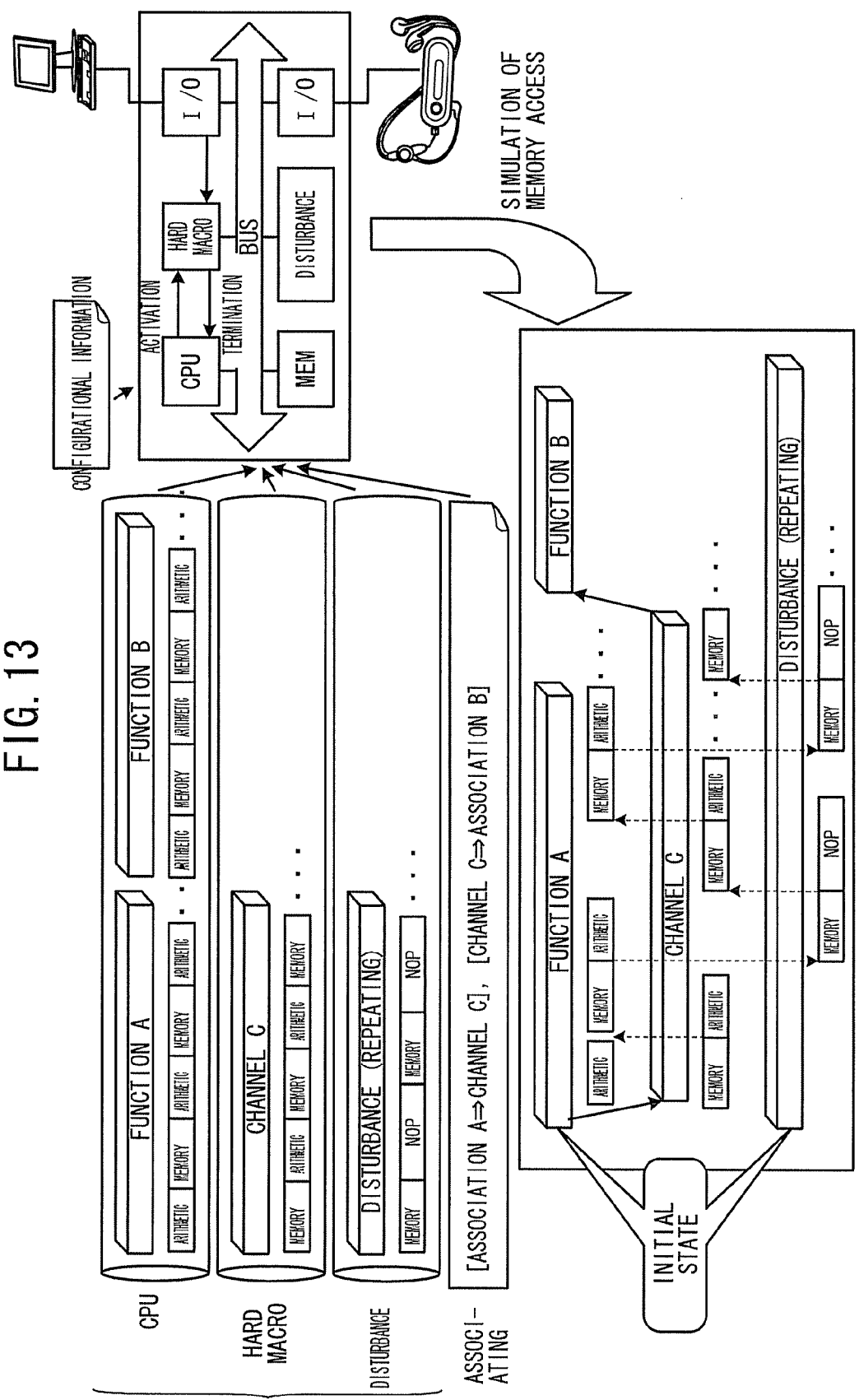
FIG. 13 is an explanatory chart illustrating an example of execution of a trace simulation.

FIG. 13 is an explanatory chart illustrating an example of execution of trace simulation. Where an arbitrary application is run on a system, the operations of the CPU and hard macro already described in connection with FIG. 12 may be affected by various factors. Accordingly, where a trace simulation is executed in practice, the performance may be evaluated at higher accuracy by preparing traces regarding assumed disturbances (such as noise produced by a hardware device other than the hard macro to be verified) according to the system to be verified and performing a simulation. Traces regarding disturbances may also be gathered from real machine environments or from software environments.

Figure 14:
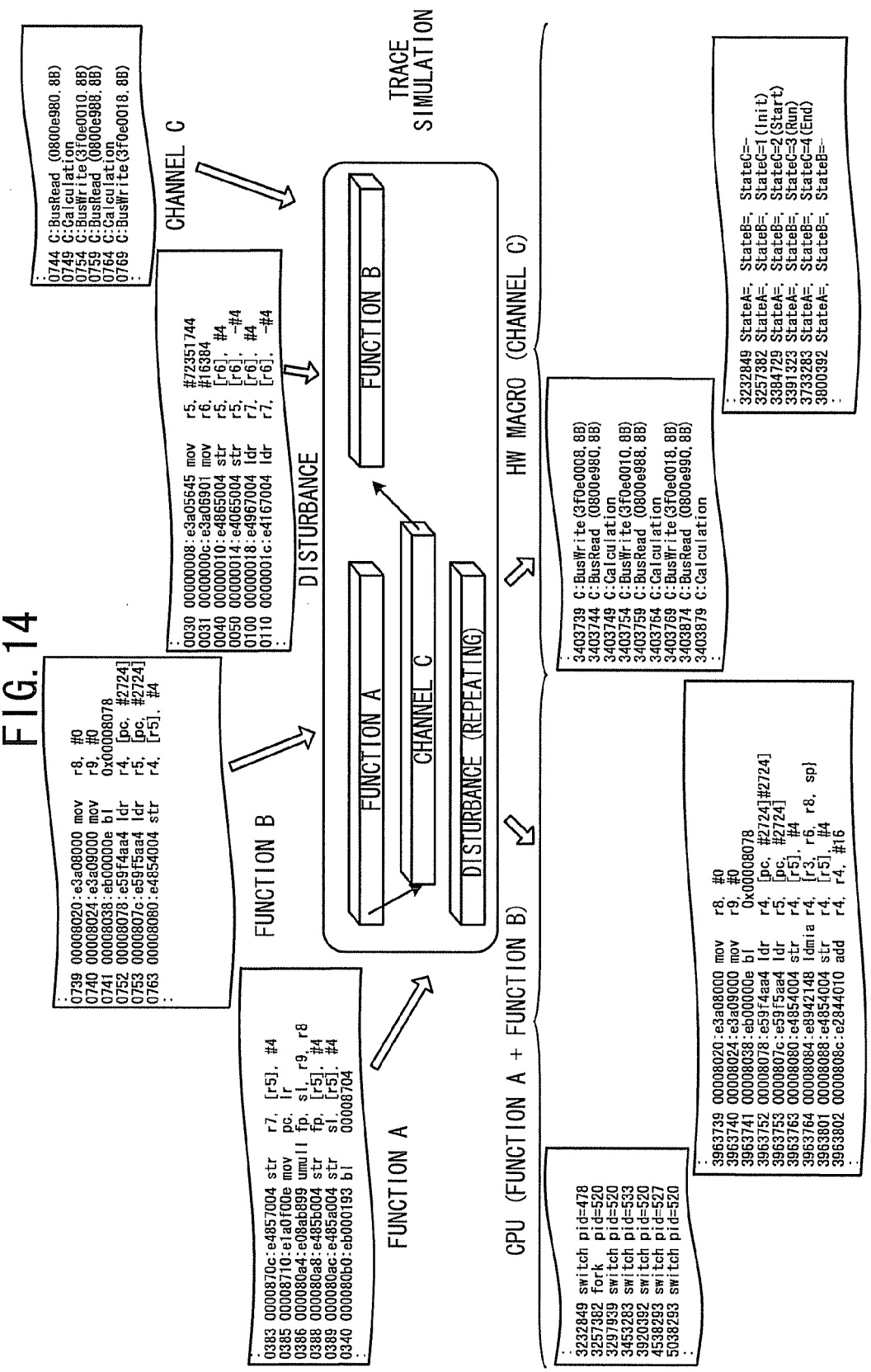
FIG. 14 is an explanatory chart illustrating examples of inputting and outputting done in a trace simulation.

FIG. 14 is an explanatory chart illustrating examples of inputting and outputting done in a trace simulation. Results of a simulation including disturbances may be obtained by adding disturbances as input information and executing the trace simulations of the CPU and hard macro as already described in connection with FIGS. 11-13.

Figure 15:
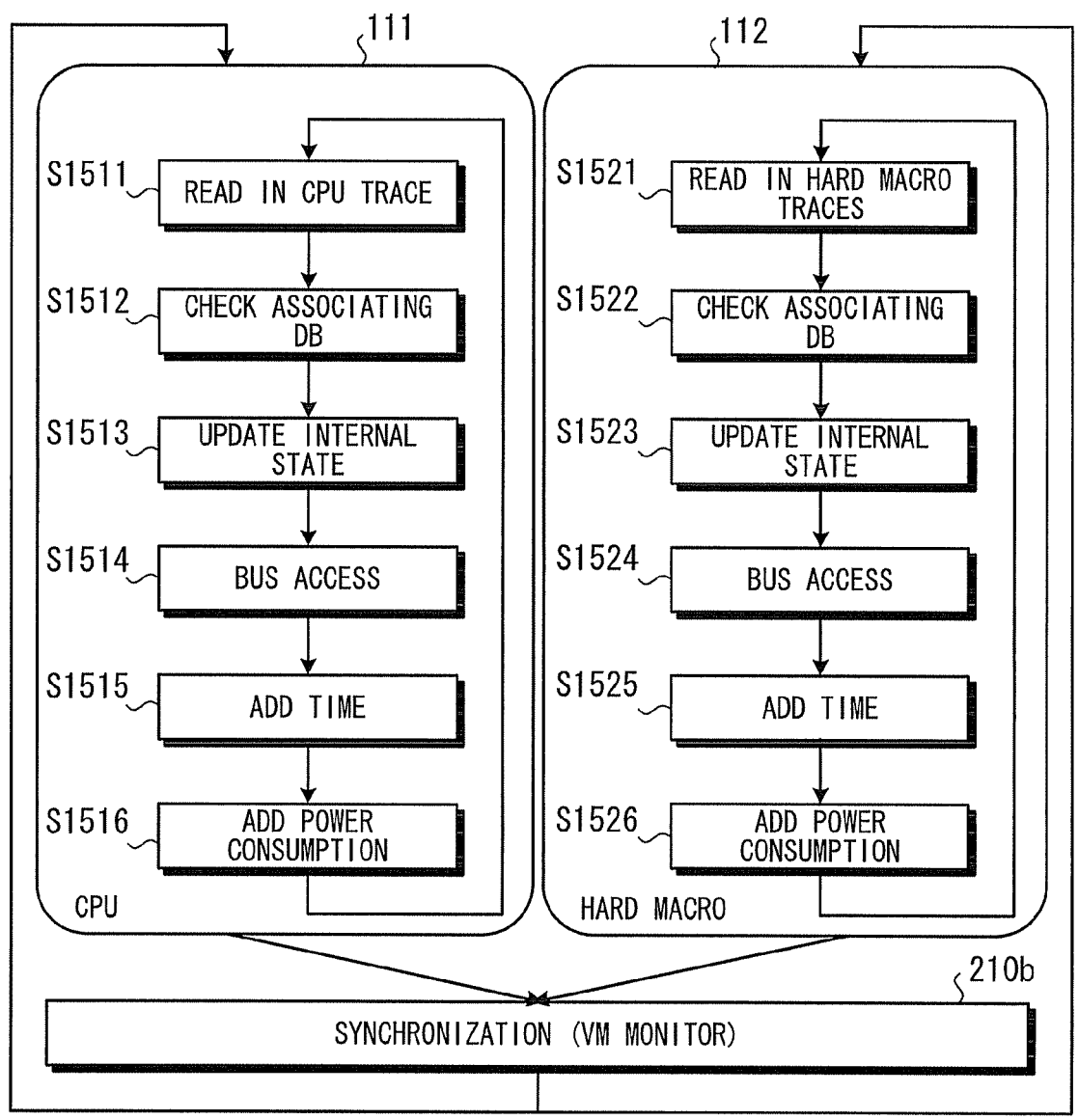
FIG. 15 is a flowchart illustrating fundamental operation(s) performed by a virtual machine.
Figure 18:
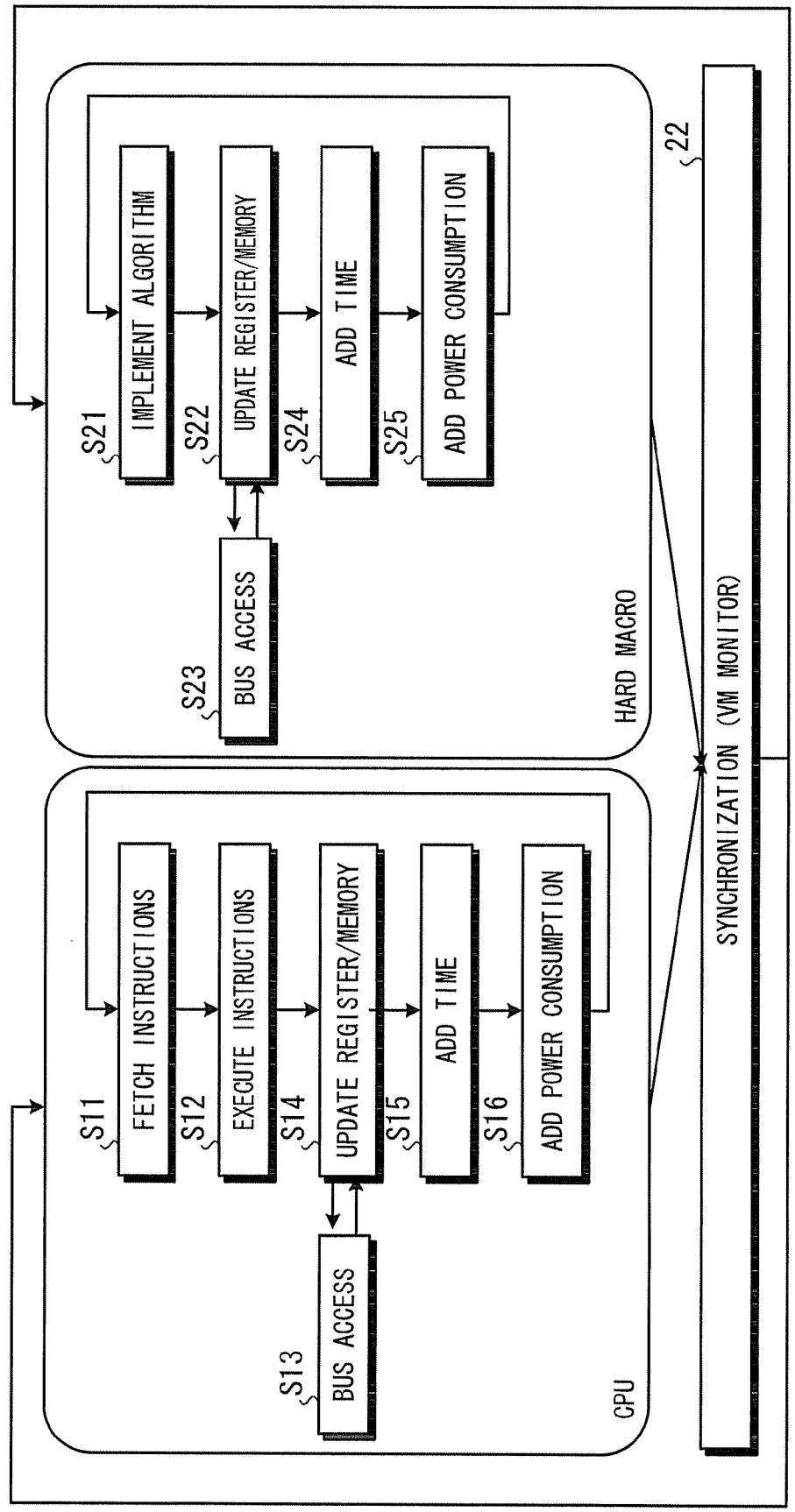
FIG. 18 is a block diagram illustrating fundamental operations performed by the typical virtual machine.
Figure 19:
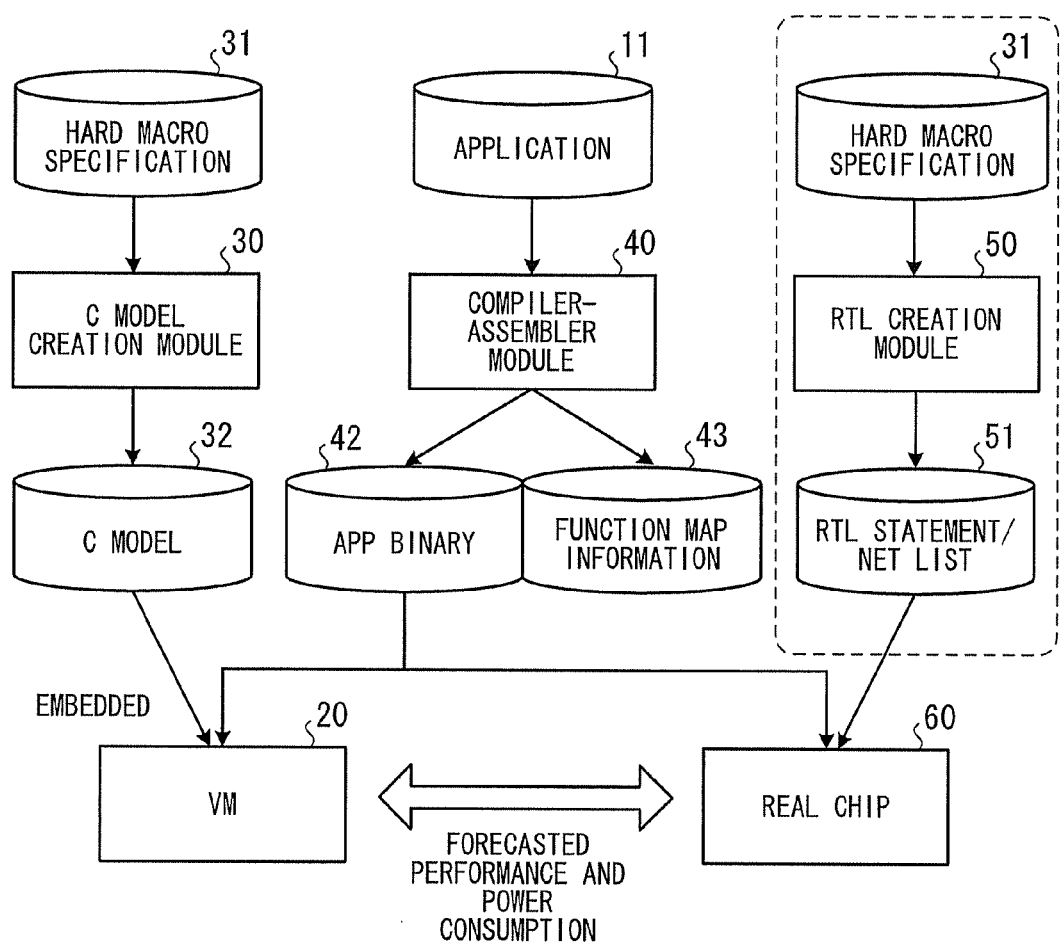
FIG. 19 is a block diagram illustrating a processing routine for support of verification of an application, the routine being performed using the typical virtual machine.

The fundamental operations performed to verify operations to be verified by a virtual machine (VM) 210 realized by the information processor 100 according to an embodiment are next described. FIG. 15 is a flowchart illustrating the fundamental operations performed by the virtual machine. In FIG. 18, the fundamental operations of the typical virtual machine 20 has been described. In the processing routine of FIG. 15, simulations in which traces are read in are main operations.

More specifically, in the case of the CPU, the information processor 100 first reads in CPU traces (i.e., traces of interest regarding the behaviors of the CPU) (operation S1511) and refers to the associating database 121 (operation S1512). Then, the information processor 100 updates the internal state (operation S1513). According to the update operation, a bus access is performed (operation S1514). When the update operation ends, time and electric power that would be consumed if the same instruction were executed on a real machine are added (operations S1515 and S1516). Program control returns to operation S1511, where program control shifts to an operation where next CPU traces are read in. With respect to the time and power consumption added in operations S1515 and S1516, forecasted values and actual measurement values according to the performance of the real machine are already prepared. These values are added.

Similarly, in the case of the hard macro, the information processor 100 reads in hard traces (traces of interest regarding the behaviors of the hard macro) (operation S1521) and refers to the associating database 121 (operation S1522). Then, the processor updates the internal state (operation S1523) and performs a bus access according to the update operation (operation S1524). When the update operation ends, the processor adds time and electric power that would be consumed if the same processing were done on a real machine (operations S1525 and S1526). Program control returns to operation S1521, where control shifts to the operation where next CPU traces are read in. With respect to the time and power consumption added in operations S1524 and S1525, forecasted values and actual measurement values according to the performance of the real machine are already prepared. These values are added.

The aforementioned operations of the CPU and hard macro are synchronized under control of the virtual machine monitor 22. Accordingly, results of simulations of cooperative operations of the CPU and hard macro may be obtained in the same way as where the application 11 is run on the hardware model 21 similarly to on a real machine by acquiring results of execution of operations of the hardware model 21. Thus, the operations may be verified.

In the above-described processing routine for support of verification, the performance is evaluated while taking notice of operations performed when a certain application is run on a system to be verified. In practical applications, plural application programs used in different applications are run in most systems to be verified. Verifiers demand techniques permitting verification of these plural application programs. A procedure is described below which applies the verification support routine in cases where a trace simulation is performed for each of plural applications run by a system to be verified.

FIG. 16 is an explanatory chart illustrating a procedure for application of a processing routine for support of verification performed by a system that executes plural applications. As illustrated in FIG. 16, in a case where the operations of plural applications that run on the same system to be verified are verified, three major processing operations 1-3 are necessary.

Operation 1: The system to be verified is divided into configurational parts (such as SW (appl) and HW (macro)) that need to be verified. In the example of FIG. 16, the system is divided into three configurational parts to be verified, i.e., control of display screen, motion picture sequence, and audio.

Operation 2: A system closest in operation to the verified configurational part selected from the arbitrary system is selected, and raw traces 101 and association information 102 are gathered. According to the need, parts may be added to an arbitrary system and the raw traces 101 may be gathered such that the configuration of the verified system is approached more closely.

Operation 3: Finally, the verification support routines A-C according to an embodiment for each configurational part are carried out, and the traces of interest 111 are extracted. The extracted traces of interest 111 for each configurational part are reconstructed based on the configurational information and synchronization information about the system to be verified. A trace simulation of the verified system is carried out using the reconstructed trace group.

In this way, in practice, it has been required to evaluate the performance of a system including plural hardware devices in a case where plural applications are run in a system to be verified. It is possible to flexibly cope with this requirement using the three operations described above. Furthermore, the traces A, B, and C extracted respectively from the configurational parts for control of display screen, motion picture sequence, and audio as illustrated in FIG. 16 may be reused when the performance of other verified system using similar configuration is evaluated.

For example, if a structure corresponding to the image control of FIG. 15 is contained as a configurational part to be verified, which is obtained by the dividing operation (Operation 1) in a system A, then the trace A may be used unchanged and traces of interest may be reconstructed according to the configuration of the system A when Operation 3 is performed.

In this way, in an embodiment, a simulation is performed based on traces irrespective of the hardware environment and the OS. Consequently, the performance of a system to be verified may be evaluated at a system development stage or even at an initial stage where the system itself does not yet exist, which has been heretofore difficult to achieve. In addition, applications may be verified in parallel with development of a hardware environment. Since the results of the verification are fed back to the development of the hardware environment, more accurate verification may be accomplished at an early stage.

Further, traces once gathered may be reused when other system is verified. Accordingly, it is expected that as the verification support processing routine according to an embodiment is used more, the time and cost required to verify systems will be reduced.

Application of the verification support routine according to an embodiment is not limited to realization of the information processor 100. For example, the verification support routine can also be applied to hardware directed towards certain applications and to power-saving tools for estimating the performance and the power consumption of a multi-core system.

The verification support method described in an embodiment can be accomplished by executing a previously prepared program on a computer such as a personal computer or workstation. The program is stored on a computer-readable recording medium such as a hard disk, flexible disk, CD-ROM, MO, or DVD. The program is run by reading it from the storage medium by the computer. The program may be distributed via a network such as the Internet.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A non-transitory computer-readable recording medium storing a verification support program that causes a computer to execute an operation, comprising:
   acquiring a trace group indicating instants of time of execution of processing operations of an arbitrary application running on an arbitrary system and vestiges of contents of the execution, behavior information indicating behaviors of a processor of the arbitrary system running the arbitrary application, and state information indicating state transitions of an arbitrary hardware device other than the processor;
   searching a behavior trace corresponding to a specified behavior from the trace group acquired based on an instant of time of execution of an arbitrary behavior that is specified from the behaviors indicated by the behavior information;
   searching a state trace corresponding to an arbitrary state transition from the trace group acquired based on an instant of time of execution of the arbitrary state transition that is specified from the state transitions indicated by the state information;
   associating traces found by the searching of the behavior trace and traces found by the searching of the state trace according to an instruction about an association between operations when the arbitrary behavior and the arbitrary state transition are executed respectively; and
   outputting the trace group that are associated in accordance with the instruction about the association between operations as traces for a simulation of the behaviors.

2. The computer-readable recording medium according to claim 1, comprising:
   identifying a state transition of an arbitrary hardware corresponding to the arbitrary behavior when the arbitrary behavior is specified in the searching of the behavior trace, and
   wherein the searching of the state trace searches a trace corresponding to the state transition from the trace group acquired based on an instant of time of execution of the state transition identified.

3. The computer-readable recording medium according to claim 1, comprising:
   creating a call graph making each trace searched by the searching of the behavior trace correspond to function information read out in the each trace, and
   wherein the outputting of the trace group outputs the call graph created.

4. The computer-readable recording medium according to claim 2, comprising:
   creating a call graph making each trace searched by the searching of the behavior trace correspond to function information read out in the each trace, and
   wherein the outputting of the trace group outputs the call graph created.

5. The computer-readable recording medium according to claim 1, comprising:
   creating a state graph making each trace searched by the searching of the state trace correspond to state information transited in the each trace, and
   wherein the outputting of the trace group outputs the state graph created.

6. The computer-readable recording medium according to claim 2, comprising:
   creating a state graph making each trace searched by the searching of the state trace correspond to state information transited in the each trace, and
   wherein the outputting of the trace group outputs the state graph created.

7. The computer-readable recording medium according to claim 3, comprising:
   creating a state graph making each trace searched by the searching of the state trace correspond to state information transited in the each trace, and
   wherein the outputting of the trace group outputs the state graph created.

8. The computer-readable recording medium according to claim 4, comprising:
   creating a state graph making each trace searched by the searching of the state trace correspond to state information transited in the each trace, and
   wherein the outputting of the trace group outputs the state graph created.

9. The computer-readable recording medium according to claim 1, comprising:
   displaying information outputted by the outputting on a display device communicable with the computer.

10. The computer-readable recording medium according to claim 2, comprising:
    displaying information outputted by the outputting on a display device communicable with the computer.

11. The computer-readable recording medium according to claim 3, comprising:
    displaying information outputted by the outputting on a display device communicable with the computer.

12. The computer-readable recording medium according to claim 4, comprising:
    displaying information outputted by the outputting on a display device communicable with the computer.

13. The computer-readable recording medium according to claim 5, comprising:
 displaying information outputted by the outputting on a display device communicable with the computer.

14. The computer-readable recording medium according to claim 1, comprising:
 executing a simulation on the arbitrary behavior by using the trace for simulation which is outputted by the outputting.

15. The computer-readable recording medium according to claim 2, comprising:
 executing a simulation on the arbitrary behavior by using the trace for simulation which is outputted by the outputting the trace group.

16. The computer-readable recording medium according to claim 3, comprising:
 executing simulation on the arbitrary behavior by using the trace for simulation which is outputted by the outputting the trace group.

17. The computer-readable recording medium according to claim 5, comprising:
 executing a simulation on the arbitrary behavior by using the trace for simulation which is outputted by the outputting of the trace group.

18. The computer-readable recording medium according to claim 9, comprising:
 executing a simulation on the arbitrary behavior by using the trace for simulation which is outputted by the outputting the trace group.

19. An information processing apparatus, comprising:
 a processor; and
 a memory which stores a plurality of instructions, which when executed by the processor, cause the processor to execute:
  acquiring a trace group indicating instants of time of execution of processing operations of an arbitrary application running on an arbitrary system and vestiges of contents of the execution, behavior information indicating behaviors of a processor of the arbitrary system running the arbitrary application, and state information indicating state transitions of an arbitrary hardware device other than the processor;
  searching, when an arbitrary behavior is specified from the behaviors indicated by the behavior information, traces corresponding to the specified arbitrary behavior from the trace group acquired based on an instant of time of execution of the arbitrary behavior;
  searching, when an arbitrary state transition is specified from the state transitions indicated by the state information, traces corresponding to the arbitrary state transition from the trace group acquired based on an instant of time of execution of the arbitrary state transition;
  associating, upon receiving an instruction about an association between operations when the arbitrary behavior and the arbitrary state transition are executed, respectively, traces found by the searching of the behavior trace and traces found by the state trace according to the instruction; and
  outputting the trace group that are associated in accordance with the instruction about the association between operations as traces for a simulation of the behaviors.

20. A verification support method executed by a computer, the method comprising:
 acquiring a trace group indicating instants of time of execution of processing operations of an arbitrary application running on an arbitrary system and vestiges of contents of the execution, behavior information indicating behaviors of a processor of the arbitrary system running the arbitrary application, and state information indicating state transitions of an arbitrary hardware device other than the processor;
 searching a behavior trace corresponding to a specified behavior from the trace group acquired based on an instant of time of execution of an arbitrary behavior that is specified from the behaviors indicated by the behavior information;
 searching a state trace corresponding to an arbitrary state transition from the trace group acquired based on an instant of time of execution of the arbitrary state transition that is specified from the state transitions indicated by the state information;
 associating traces found by the searching of the behavior trace procedure and traces found by the searching of the state trace procedure according to an instruction about an association between operations when the arbitrary behavior and the arbitrary state transition are executed respectively; and
 outputting the trace group that are associated in accordance with the instruction about the association between operations as traces for a simulation of the behaviors.

* * * * *